· US010721769B2

United States Patent
Patil et al.

(10) Patent No.: US 10,721,769 B2
(45) Date of Patent: Jul. 21, 2020

(54) LISTEN-BEFORE-TALK TECHNIQUES IN SYNCHRONOUS SYSTEMS

(71) Applicant: QUALCOMM Incorporated, San Diego, CA (US)

(72) Inventors: Shailesh Patil, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 15/646,618

(22) Filed: Jul. 11, 2017

(65) Prior Publication Data

US 2018/0160452 A1 Jun. 7, 2018

Related U.S. Application Data

(60) Provisional application No. 62/428,898, filed on Dec. 1, 2016.

(51) Int. Cl.
*H04W 74/08* (2009.01)
*H04W 16/14* (2009.01)
(Continued)

(52) U.S. Cl.
CPC ....... *H04W 74/0816* (2013.01); *H04W 16/14* (2013.01); *H04W 56/001* (2013.01);
(Continued)

(58) Field of Classification Search
CPC ........... H04W 74/0816; H04W 56/001; H04W 74/0808; H04W 16/14; H04W 72/0446; H04W 88/02
See application file for complete search history.

(56) References Cited

U.S. PATENT DOCUMENTS 6,351,459 B1 * 2/2002 Kondo .............. H04W 74/0866
370/330
9,113,483 B2 * 8/2015 Zou ........................ H04W 16/14
(Continued)

FOREIGN PATENT DOCUMENTS

EP 0920226 A2 6/1999
EP 2528402 A1 11/2012
(Continued)

OTHER PUBLICATIONS

ISA/EP, International Search Report and Written Opinion of the International Searching Authority, Int'l Application No. PCT/US2017/056528, dated Jan. 18, 2018, European Patent Office, Rijswijk, NL, 15 pgs.

*Primary Examiner* — Tejis Daya
(74) *Attorney, Agent, or Firm* — Holland & Hart LLP

(57) ABSTRACT

Methods, systems, and devices for wireless communication are described. Contention procedures may include a shared radio frequency (RF) spectrum region to access resources in another shared RF spectrum region. For example, a wireless device may operate in a synchronous system and identify a set of target resources for a data transmission. The wireless device may contend for the target resources by performing a procedure, such as a listen-before-talk (LBT) procedure, in a first shared RF spectrum region that is smaller than, and overlaps in frequency with, a second shared RF spectrum region that includes the target resources. Resources used for the LBT procedure may be included in a different time period than the target resources, where LBT resources may correspond to target resources in different time periods. The target resources may also include multiple sub-channels, and LBT resources may be mapped to one or more of the sub-channels.

30 Claims, 14 Drawing Sheets

LBT Resources

Target Resources

(51) Int. Cl.
*H04W 56/00* (2009.01)
*H04W 72/04* (2009.01)
*H04W 88/02* (2009.01)

(52) U.S. Cl.
CPC ... *H04W 72/0446* (2013.01); *H04W 74/0808* (2013.01); *H04W 88/02* (2013.01)

(56) References Cited

U.S. PATENT DOCUMENTS

| | | | |
|---|---|---|---|
| 9,220,115 B2* | 12/2015 | Bhushan | H04W 74/08 |
| 10,085,284 B2* | 9/2018 | Chien | H04W 74/0816 |
| 2010/0074190 A1* | 3/2010 | Cordeiro | H04W 48/16 |
| | | | 370/329 |
| 2012/0129560 A1* | 5/2012 | Lunden | H04W 72/10 |
| | | | 455/512 |
| 2012/0307870 A1* | 12/2012 | Hakola | H04B 1/713 |
| | | | 375/135 |
| 2013/0195071 A1* | 8/2013 | Ohta | H04W 72/0453 |
| | | | 370/330 |
| 2014/0164864 A1* | 6/2014 | Takeda | H04L 1/1854 |
| | | | 714/749 |
| 2015/0031375 A1* | 1/2015 | Lamy-Bergot | H04W 76/14 |
| | | | 455/450 |
| 2015/0271847 A1* | 9/2015 | Luo | H04W 74/002 |
| | | | 370/329 |
| 2015/0296385 A1* | 10/2015 | Zhang | H04W 16/14 |
| | | | 370/329 |
| 2015/0319784 A1* | 11/2015 | Bhushan | H04W 74/08 |
| | | | 370/329 |
| 2015/0341921 A1* | 11/2015 | Chen | H04W 72/0413 |
| | | | 370/330 |
| 2015/0373582 A1* | 12/2015 | Valliappan | H04W 28/08 |
| | | | 370/329 |
| 2016/0073405 A1* | 3/2016 | Khawer | H04L 5/0007 |
| | | | 370/329 |
| 2016/0100404 A1* | 4/2016 | Han | H04L 5/00 |
| | | | 370/329 |
| 2016/0119922 A1* | 4/2016 | Ye | H04W 74/004 |
| | | | 370/336 |
| 2016/0135189 A1* | 5/2016 | Chandrasekhar | H04W 72/0453 |
| | | | 370/329 |
| 2016/0226637 A1* | 8/2016 | Nory | H04L 5/0053 |
| 2016/0302076 A1* | 10/2016 | Chou | H04W 16/14 |
| 2016/0302231 A1* | 10/2016 | Chien | H04W 74/0816 |
| 2016/0360422 A1* | 12/2016 | Zhang | H04W 16/14 |
| 2016/0360525 A1* | 12/2016 | Cheng | H04L 5/001 |
| 2017/0006633 A1* | 1/2017 | Zhang | H04W 72/0406 |
| 2017/0013469 A1* | 1/2017 | Larsson | H04W 16/14 |
| 2017/0118728 A1* | 4/2017 | Harada | H04W 52/38 |
| 2017/0188387 A1* | 6/2017 | Mukherjee | H04W 74/0808 |
| 2017/0215206 A1* | 7/2017 | Cheng | H04W 74/0816 |
| 2017/0257775 A1* | 9/2017 | Jiang | H04W 16/14 |
| 2017/0265214 A1* | 9/2017 | Hessler | H04B 7/0456 |
| 2017/0310434 A1* | 10/2017 | Harada | H04B 17/318 |
| 2018/0054741 A1* | 2/2018 | Froberg Olsson | H04W 16/14 |

FOREIGN PATENT DOCUMENTS

| | | |
|---|---|---|
| EP | 2536235 A1 | 12/2012 |
| WO | WO-2015094046 A1 | 6/2015 |

* cited by examiner

LBT Resources

Target Resources

LISTEN-BEFORE-TALK TECHNIQUES IN SYNCHRONOUS SYSTEMS

CROSS REFERENCES

The present application for patent claims priority to U.S. Provisional Patent Application No. 62/428,898 by Patil, et al., entitled "LISTEN-BEFORE-TALK TECHNIQUES IN SYNCHRONOUS SYSTEMS," filed Dec. 1, 2016, assigned to the assignee hereof, and is hereby expressly incorporated by reference herein in its entirety.

INTRODUCTION

The following relates generally to wireless communication, and more specifically to listen-before-talk (LBT) techniques in synchronous systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems may operate using shared radio frequency (RF) spectrum where one or more frequency bands may be shared by wireless devices. Accordingly, techniques for contention for communication resources by and between these devices may be utilized, such as LBT procedures. In some cases, a wireless device may sense a channel to determine whether other devices are communicating on the channel. However, when resources across the frequency of the channel are used for sensing, LBT procedures may be associated with a high amount of overhead and an inefficient use of system resources.

SUMMARY

A method of wireless communication is described. The method may include performing, by a UE in a synchronous communications system, an LBT procedure in a first shared RF spectrum region to access resources in a second shared RF spectrum region that is different than the first shared RF spectrum region and transmitting data using the resources in the second shared RF spectrum region based at least in part on the performed LBT procedure.

An apparatus for wireless communication is described. The apparatus may include means for performing, in a synchronous communications system, an LBT procedure in a first shared RF spectrum region to access resources in a second shared RF spectrum region that is different than the first shared RF spectrum region and means for transmitting data using the resources in the second shared RF spectrum region based at least in part on the performed LBT procedure.

Another apparatus for wireless communication is described. The apparatus may include a processor, memory in electronic communication with the processor, and instructions stored in the memory. The instructions may be operable to cause the processor to perform, in a synchronous communications system, an LBT procedure in a first shared RF spectrum region to access resources in a second shared RF spectrum region that is different than the first shared RF spectrum region and transmit data using the resources in the second shared RF spectrum region based at least in part on the performed LBT procedure.

A non-transitory computer readable medium for wireless communication is described. The non-transitory computer-readable medium may include instructions operable to cause a processor to perform, in a synchronous communications system, an LBT procedure in a first shared RF spectrum region to access resources in a second shared RF spectrum region that is different than the first shared RF spectrum region and transmit data using the resources in the second shared RF spectrum region based at least in part on the performed LBT procedure.

In some examples of the method, apparatus, and non-transitory computer-readable medium described above, the first shared RF spectrum region overlaps in frequency with the second shared RF spectrum region. In some examples of the method, apparatus, and non-transitory computer-readable medium described above, the first shared RF spectrum region corresponds to a first time period and the second shared RF spectrum region corresponds to a second time period different from the first time period.

Some examples of the method, apparatus, and non-transitory computer-readable medium described above may further include processes, features, means, or instructions for performing a second LBT procedure in a third shared RF spectrum region to access resources in a fourth shared RF spectrum region, where the third shared RF spectrum region overlaps in time with the first shared RF spectrum region, and where the third shared RF spectrum region corresponds to a third time period and the fourth shared RF spectrum region corresponds to a fourth time period different from the third time period.

Some examples of the method, apparatus, and non-transitory computer-readable medium described above may further include processes, features, means, or instructions for transmitting data using the resources in the fourth shared RF spectrum region based on the performed second LBT procedure. In some examples of the method, apparatus, and non-transitory computer-readable medium described above, transmitting data using the resources in the fourth shared RF spectrum region and using the resources in the second shared RF spectrum region includes transmitting data continuously across the resources in the second shared RF spectrum region and the resources in the fourth shared RF spectrum region.

In some examples of the method, apparatus, and non-transitory computer-readable medium described above, the second shared RF spectrum region includes resources allocated in multiple sub-channels, and where the LBT procedure may be performed to access resources in a first sub-channel of the multiple sub-channels. Some examples of the method, apparatus, and non-transitory computer-readable medium described above may further include processes, features, means, or instructions for performing, during the LBT procedure, a second LBT procedure in a third shared RF spectrum region to access resources in a second sub-channel of the multiple sub-channels, where the third shared RF spectrum region overlaps in time with the first shared RF spectrum region. Some examples of the method, apparatus, and non-transitory computer-readable medium described above may further include processes, features, means, or instructions for transmitting data using the resources in the first sub-channel and resources in the second sub-channel based on the performed second LBT procedure.

Some examples of the method, apparatus, and non-transitory computer-readable medium described above may further include processes, features, means, or instructions for determining a maximum transmit power for transmissions in at least one of the first shared RF spectrum region and the third shared RF spectrum region. Some examples of the method, apparatus, and non-transitory computer-readable medium described above may further include processes, features, means, or instructions for transmitting, at a transmit power lower than the maximum transmit power, using the first shared RF spectrum region and the third shared RF spectrum region based on the determined maximum transmit power.

Some examples of the method, apparatus, and non-transitory computer-readable medium described above may further include processes, features, means, or instructions for decrementing a backoff count associated with the LBT procedure and the second LBT procedure, where transmitting data using the resources in the first sub-channel and transmitting data using the resources in the second sub-channel may be based on the backoff count reaching a value.

Some examples of the method, apparatus, and non-transitory computer-readable medium described above may further include processes, features, means, or instructions for identifying an indication of a range of starting values for the backoff count, where the range of starting values may be based on a number of resources used for transmitting data. Some examples of the method, apparatus, and non-transitory computer-readable medium described above may further include processes, features, means, or instructions for selecting a starting value for the backoff count based on the received indication of the range of starting values.

Some examples of the method, apparatus, and non-transitory computer-readable medium described above may further include processes, features, means, or instructions for identifying an indication of a size of the first shared RF spectrum region, where the indication may be based on a size of the second shared RF spectrum region, an energy measurement criterion, or both. Some examples of the method, apparatus, and non-transitory computer-readable medium described above may further include processes, features, means, or instructions for selecting the size of the first shared RF spectrum region based on the received indication.

In some examples of the method, apparatus, and non-transitory computer-readable medium described above, a size of the first shared RF spectrum region may be smaller than a size of the second shared RF spectrum region. In some examples of the method, apparatus, and non-transitory computer-readable medium described above, the second shared RF spectrum region includes resources allocated in multiple sub-channels, and where the LBT procedure in the first shared RF spectrum region may be performed to access resources in a subset of the multiple sub-channels.

DETAILED DESCRIPTION

Figure 1:
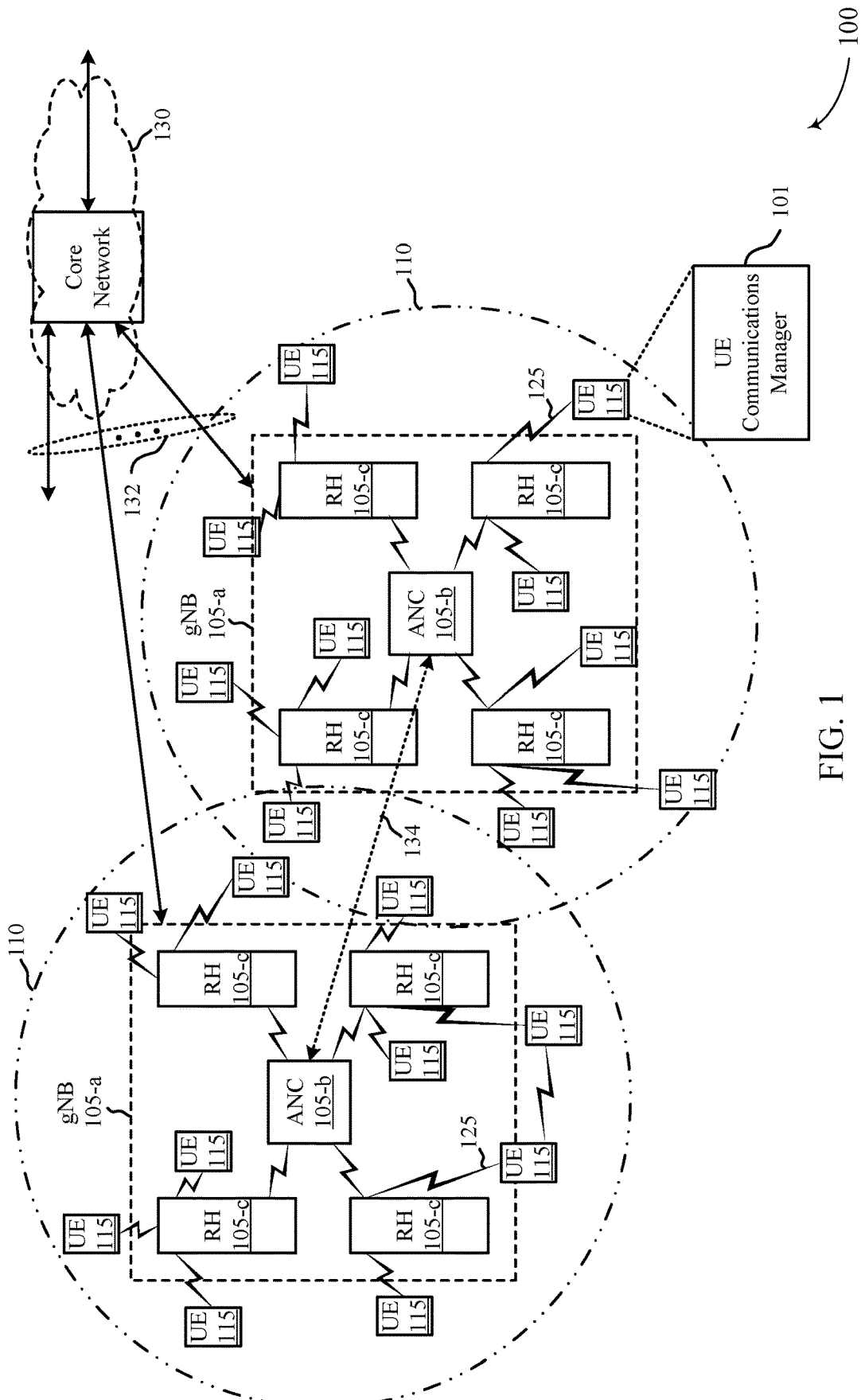
FIG. 1 illustrates an example of a system for wireless communication that supports LBT techniques in synchronous systems in accordance with one or more aspects of the present disclosure.

Some wireless communications systems may use contention resolution schemes to enable multiple devices to communicate using shared RF spectrum. For example, in a system that includes autonomous access for device-to-device (D2D) or vehicle-to-everything (V2X) communications, multiple wireless devices (e.g., UEs) may try to simultaneously access the same resources. LBT procedures, as merely one example, may be used by the wireless devices to avoid collisions when devices contend for the same resources. Before accessing an identified resource for transmission, a UE may listen for a short, but random, amount of time during which the UE determines whether another device is transmitting on the resources. If no other device is transmitting, then the UE may transmit using the identified resources. Otherwise, if some amount of energy is detected and another device is transmitting, the UE may refrain from transmitting on the identified resources.

Resources designated for LBT procedures may occur in time before resources targeted for data transmissions (e.g., target resources), and in some cases, LBT procedures may be associated with signaling overhead. That is, LBT resources (e.g., one or more sets of resource blocks) may occupy a same number of or amount of RF spectrum bands as the resources used for data transmissions. Accordingly, the same amount of bandwidth used for LBT resources may result in increased overhead within the system—leading to an inefficient use of system resources.

LBT procedures may be performed using a mapping of LBT resources to target resources that improves resource usage efficiency. For example, resources used for LBT procedures and resources used for data transmissions may occupy RF spectrum regions of different sizes (e.g., having a different number of RF spectrum bands). Resources used for LBT procedures may, in some cases, use a smaller region of frequency bands than a region of frequency bands for transmitting data, where the different regions may overlap with each other. The use of smaller RF spectrum regions for LBT resources may accordingly reduce overhead for LBT procedures and provide other benefits, including in synchronous systems.

A mapping between LBT resources and target resources may allow for pipelining of target resources and LBT resources, where a set of LBT resources in a first shared RF spectrum region during a first time period corresponds to a respective set of target resources in a larger RF spectrum region during a second subsequent time period. Additionally or alternatively, there may be a separate set of resources used for LBT procedures and target resources. That is, the RF spectrum region for LBT resources may occupy a different time period than the RF spectrum region for target resources, where, for example, a first transmission time interval (TTI) (e.g., a subframe) may be used for multiple sets of LBT resources with subsequent TTIs used for data transmissions. In some examples, target resources may be different sizes, and LBT procedures in shared RF spectrum regions may be based on the size of the target resources by using a mapping between LBT resources and target resources. In such cases, the target resources may be divided into sub-channels, and respective LBT resources may be mapped to one or more sub-channels.

The size of the shared RF spectrum region used for LBT resources may be fixed, or may be configured or pre-configured by a network and communicated to a UE. In such cases, the size of the LBT resources may vary based on a number of different factors, where the size of the LBT resources may be related to a size of a set of target resources, or may be defined in terms of a measurement accuracy condition used for measuring energy in the system. Additionally or alternatively, the network may determine resource mapping for LBT procedures based on a specific application or an amount of latency or near-far effect within the system.

Aspects of the disclosure are initially described in the context of a wireless communications system. Further examples are then provided of resource mappings that enable smaller RF spectrum regions used for LBT resources. Aspects of the disclosure are further illustrated by and described with reference to apparatus diagrams, system diagrams, and flowcharts that relate to LBT techniques in synchronous systems.

FIG. 1 illustrates an example of a wireless communications system 100 in accordance with one or more aspects of the present disclosure. The wireless communications system 100 includes base stations 105 (e.g., gNodeBs (gNBs) and/or radio heads (RHs)), UEs 115, and a core network 130. In some examples, the wireless communications system 100 may be a LTE (or LTE-Advanced (LTE-A)) network, or a NR network. In some cases, wireless communications system 100 may support enhanced broadband communications, ultra-reliable (i.e., mission critical) communications, low latency communications, and communications with low-cost and low-complexity devices. Wireless communications system 100 may enable the use of LBT procedures in a smaller shared RF spectrum region to access resources in a different shared RF spectrum region.

In some examples, the wireless communications system 100 may include a 5G network. In other examples, the wireless communications system 100 may include an LTE/LTE-A network. The wireless communications system 100 may in some cases be a heterogeneous network, in which different types of eNBs provide coverage for various geographical regions. The term "cell" is a 3GPP term that can be used to describe a base station, a radio head (RH), a carrier or component carrier associated with a base station or an RH, or a coverage area (e.g., sector, etc.) of a carrier or base station, depending on context.

UEs 115 may include a UE communications manager 101, which may manage LBT procedures, transmit power, and transmitting data based on the LBT procedures. The UE communications manager 101 may be an example of a communications manager, as described with reference to FIGS. 7 through 10. For example, UE communications manager 101 may perform, in a synchronous communications system, an LBT procedure in a first shared RF spectrum region to access resources in a second shared RF spectrum region that is different than the first shared RF spectrum region and transmit data using the resources in the second shared RF spectrum region based on the performed LBT procedure.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or D2D protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

A UE 115 may be an example of a vehicle that is capable of V2X communications. V2X communications may include a number of different communication applications where signals are transmitted between a vehicle and other devices (e.g., another UE 115) that may affect the vehicle, including vehicle-to-infrastructure (V2I) communications, vehicle-to-vehicle (V2V) communications, vehicle-to-pedestrian (V2P) communications, vehicle-to-device (V2D) communications, vehicle-to-grid (V2G) communications, and the like. In some cases, V2X communications may include multiple devices autonomously accessing shared RF spectrum to transmit data.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. The core network 130 may provide user authentication, access authorization, tracking, Internet Protocol (IP) connectivity, and other access, routing, or mobility functions. For example, base stations 105 (e.g., eNodeBs (eNBs), network access devices, gNBs 105-a, or access node controllers (ANCs) 105-b) may interface with the core network 130 through backhaul links 132 (e.g., S1, S2, etc.). Base stations 105 may communicate with one another over backhaul links 134 (e.g., X1, X2, etc.) either directly or indirectly (e.g., through core network 130). Each access node controller (ANC) 105-b may additionally or alternatively communicate with a number of UEs 115 through a number of smart RHs 105-c. In an alternative configuration of the wireless communications system 100, the functionality of an ANC 105-b may be provided by an RH 105-c or distributed across the RHs 105-c of an gNB 105-a. Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as gNBs or eNBs 105. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

A base station 105 may be connected by an S1 interface to the core network 130. The core network may be an evolved packet core (EPC), which may include at least one mobility management entity (MME), at least one serving gateway (S-GW), and at least one packet data network gateway (P-GW). The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

In some cases, UE 115 and base station 105 may operate in a shared radio frequency spectrum band, which may include licensed RF spectrum, unlicensed RF spectrum, or a combination of licensed and unlicensed RF spectrum. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform an LBT procedure such as a clear channel assessment (CCA) prior to communicating in order to determine whether the shared channel is available.

A CCA may include an energy detection or energy sensing procedure to determine whether there are any other active transmissions. For example, each UE 115 may randomly choose a backoff counter (which may be a certain duration or a number of symbols) and listen to a channel including resources the UEs 115 are contending for until the counter decrements to zero. If the counter reaches zero for a certain UE 115 and no other transmissions are detected, the UE 115 may start transmitting. If the counter doesn't reach zero before another signal is detected, the UE 115 has lost contention for the resources and refrains from transmitting.

In some examples, a UE 115 may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In some examples, the wireless communications system 100 may be time-synchronized. As a result, different wireless devices may each operate at different time intervals within a frame of time, with each network operating entity being time-synchronized with other network operating entities. Traditionally, a UE 115 attempting to access wireless communications system 100 may perform an initial cell search by detecting a primary synchronization signal (PSS) from a base station 105. The PSS may enable synchronization of slot timing and may indicate a physical layer identity value. The UE 115 may then receive an secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a physical hybrid automatic repeat request (HARD) indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring.

Synchronization with wireless communications system 100 may be performed by one or more wireless nodes (e.g., UEs 115, base station 105, or nodes of the core network 130) using a common preamble. The common preamble may be transmitted by multiple wireless nodes, each of the multiple wireless nodes may be associated with one or more network operating entities. Using the common preamble, a device (e.g., a UE 115) may discover resources (e.g., time) designated for use by one or more network operating entities and may synchronize in time with a frame of a shared radio frequency spectrum.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol may contain 2048 sample periods. However, in some cases as described below, symbols within wireless communications system 100 may also have different durations. For instance, shorter symbols may be used for channel sensing in LBT procedures, and longer symbols may be used for data transmissions. In some cases, the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may, for example, contain 12 consecutive subcarriers in the frequency domain and, for a normal cyclic prefix in each symbol (e.g., an orthogonal frequency division multiplexed (OFDM) symbol), 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

Wireless communications system 100 may support contention procedures using a shared RF spectrum region to access resources in another shared RF spectrum region. For example, a wireless device (such as a UE 115) may identify a set of resources for the transmission of data (e.g., a set of target resources) within wireless communications system 100. The UE 115 may then contend for access to the target resources by performing an LBT procedure in a first shared RF spectrum region that is smaller than, and overlaps in frequency with, a second shared RF spectrum region that includes the target resources. Upon winning contention during the LBT procedure, the UE 115 may then use the target resources within the second shared RF spectrum region. In some cases, resources used for the LBT procedure may be included in a different time period (e.g., subframe) than the target resources, where different sets of LBT resources within shared RF spectrum regions may correspond to target resources in different time periods. Additionally or alternatively, the target resources may include multiple sub-channels, and different sets of LBT resources may be mapped to one or more sub-channels.

Figure 2:
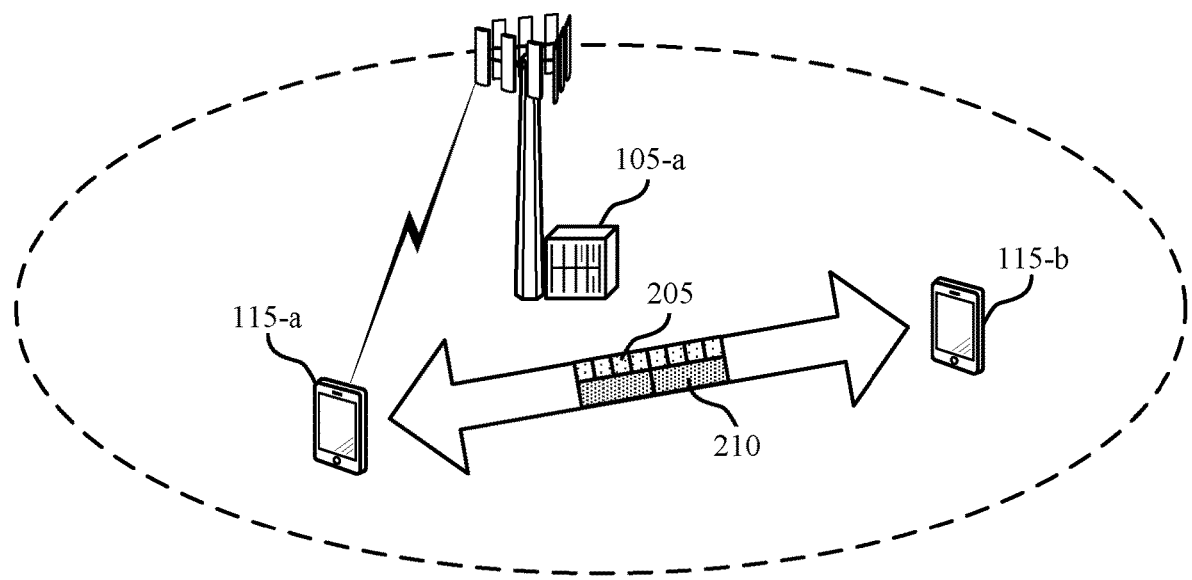
FIG. 2 illustrates an example of a wireless communications system that supports LBT techniques in synchronous systems in accordance with one or more aspects of the present disclosure.

FIG. 2 illustrates an example of a wireless communications system 200 that supports LBT techniques in synchronous systems in accordance with one or more aspects of the present disclosure. Wireless communications system 200 may include a base station 105-*a*, UE 115-*a*, and UE 115-*b* that may be examples of the corresponding devices described with reference to FIG. 1. For instance, UE 115-*a* may be an example of a vehicle that is capable of V2X communications with UE 115-*b* (e.g., V2D communications), or UE 115-*a* may be an example of a wireless device that communicates with UE 115-*b* using D2D communications and/or other communications, such as those in any shared spectrum system. Wireless communications system 200 may be an example of LBT procedures using resources in a first shared RF spectrum region that is of a different bandwidth and overlaps with target resources in a second shared RF spectrum region.

Wireless communications system 200 may use contention resolution schemes to enable multiple devices (e.g., including UE 115-*a* and UE 115-*b*) to fairly communicate using shared radio frequency spectrum. For example, wireless communications system 200 may enable autonomous access by UE 115-*a* and UE 115-*b* for D2D or V2X communications, where UE 115-*a* and UE 115-*b* attempt to simultaneously access the same resources. The LBT procedures may thus be used by UE 115-*a* and UE 115-*b* to overcome collisions when contending for the same resources. In some cases, LBT procedures used may be associated with signaling overhead and an inefficient use of resources. For example, resources used for sensing during the LBT procedure may occupy the same number of RF spectrum bands as the resources used for data transmissions. In such cases, the size of the resources used for LBT procedures may result in unnecessary overhead and an inefficient use of system resources.

In wireless communications system 200, LBT procedures may be performed using a mapping of LBT resources 205 that improves resource usage efficiency. For example, resources used for LBT procedures and resources used for data transmissions may occupy different RF spectrum regions. That is, resources used for LBT procedures may be included in RF spectrum regions that are of different size (e.g., fewer RF spectrum bands) than an RF spectrum region used to communicate data on a set of target resources 210, where the RF spectrum region used for LBT procedures may overlap with the RF spectrum region used for communicating data.

As mentioned above, the resources designated for LBT procedures may be smaller in frequency with respect to resources used for data transmissions that may accordingly reduce overhead for LBT procedures. Accordingly, mapping LBT resources 205 to smaller RF spectrum regions may enhance communications efficiency in synchronous communications systems, such as NR systems, and with D2D or V2X communications. The size of the RF spectrum region used for LBT resources 205 may be fixed or may be configured or pre-configured by a network and communicated to a UE 115. Additionally, the size of the RF spectrum region used for LBT resources 205 may vary based on a number of different factors. For instance, the size of the LBT resources 205 may be related to a size of target resources 210 or may be defined in terms of a measurement accuracy condition used for measuring energy in wireless communications system 200. In some examples, the size of the LBT resources 205 may be related to some function of data to be transmitted on the target resources 210 (e.g., 25% of the resources used for data transmission). In such cases, base station 105-*a* may communicate the configuration of the LBT resources 205 to UE 115-*a* and UE 115-*b*.

Some mappings between LBT resources 205 and target resources 210 may allow for pipelining of target resources 210 and LBT resources 205 (e.g., where sets of LBT resources 205 are configured in series with sets of target resources 210, where a set of LBT resources 205 corresponds to a respective set of target resources 210 in a subsequent time period). In such cases, greater efficiency may be achieved for LBT procedures in synchronous systems by enabling the use of a RF spectrum region for data communications with a smaller RF spectrum region used for LBT.

In some cases, there may be an issue of a near-far effect when using LBT resources 205 in a smaller RF spectrum region than resources used for data transmissions. That is, LBT resources 205 may de-sense target resources 210 in cases where some devices may be further away than other devices. For example, a UE 115 may be close to UE 115-*a* and transmitting on a first channel, and another UE 115 may be farther away that is transmitting on another channel. Any sensing by UE 115-*a* on the first channel may result in more power detected, and sensing on the second channel may result in a smaller amount of power detected. However, in such cases, there may be some leakage from the first channel to the second channel, where the leakage may be a result of, for example, phase noise or non-linear factors in wireless communications system 200. Accordingly, some resources may be associated with a location to resolve any near-far effects. For instance, LBT procedures may be allowed for devices, such as UE 115-*b*, that are in proximity of UE 115-*a* and transmitting on the target resources 210.

In some applications, such as a platooning system for V2V communications, the near-far effect may not be prominent, and a configuration with LBT resources 205 overlapping the target resources 210 may be used to achieve efficient resource usage without an impact of near-far effects. In some examples, alternate mappings may be used for LBT and data resources. That is, there may be a separate set of resources used for LBT procedures and a separate set of resources for target resources 210. In such cases, the LBT resources 205 may occupy a different time period than the target resources 210, where, for example, a first TTI (e.g., a subframe) may be used for LBT resources 205 with subsequent TTIs used for data transmissions. Such a mapping may be configured or pre-configured by a network, and the network may configure the resource mapping based on a level of latency or a level of near-far effects within wireless communications system 200. Additionally or alternatively, the network may determine the mapping based on a specific application.

In some examples, target resources 210 may be different sizes that may depend on a physical data unit size (e.g., a medium access control (MAC) protocol data unit (PDU) size). Accordingly, LBT procedures may be based on the size of the target resources 210 by using a mapping between LBT resources 205 and different target resources 210. That is, the target resources 210 may be divided into sub-channels of equal size, and respective LBT resources 205 may be mapped to each sub-channel.

In some cases, UE 115-*a* and UE 115-*b* may transmit using two or more of these sub-channels and may accordingly perform an LBT procedure by simultaneously transmitting using the LBT resources 205 for the sub-channels that include the target resources 210. In such cases, the LBT resources 205 may be frequency division multiplexed during the same TTI, and a same backoff counter may be used for all LBT resources 205 that are used by UE 115-*a* and UE 115-*b*. When transmitting on multiple LBT resources 205, a power budget limitation may be avoided by configuring or pre-configuring a maximum transmit power for each LBT resource. Accordingly, a UE 115 may transmit on more than one LBT resource without being power limited.

When a UE 115 intends to transmit on more than one of target resources 210, the UE 115 may not be able to win all of the target resources 210 simultaneously. In some cases, unless the UE 115 wins the LBT for all resources that it is contending for, the UE 115 may be unable to transmit. However, a backoff counter may be biased in such a way that a UE 115 targeting more than one sub-channel of target resources 210 may select from a smaller range of backoff counters as compared to other UEs 115 that are contending for a single sub-channel. In some cases, the range of sub-channels for different UEs 115 may not overlap. That is, UE 115-a may contend for access to two or more sub-channels using a different range for a backoff counter than UE 115-b that is contending for access for a single sub-channel. The ranges for the sub-channels may be configured or pre-configured by the network and likewise indicated by base station 105-a.

LBT resources 205 may also correspond to different sets of target resources 210. For example, a first set of LBT resources 205 may correspond to multiple sub-channels of target resources 210, and another set of LBT resources 205 may correspond to three sub-channels of target resources 210, and so on (e.g., a one-to-many mapping of LBT resources 205). If a UE 115 observes that a set of target resources 210 are already contended for in earlier LBT resources 205, then the UE 115 may refrain from contending for the same target resources 210.

Figure 3:
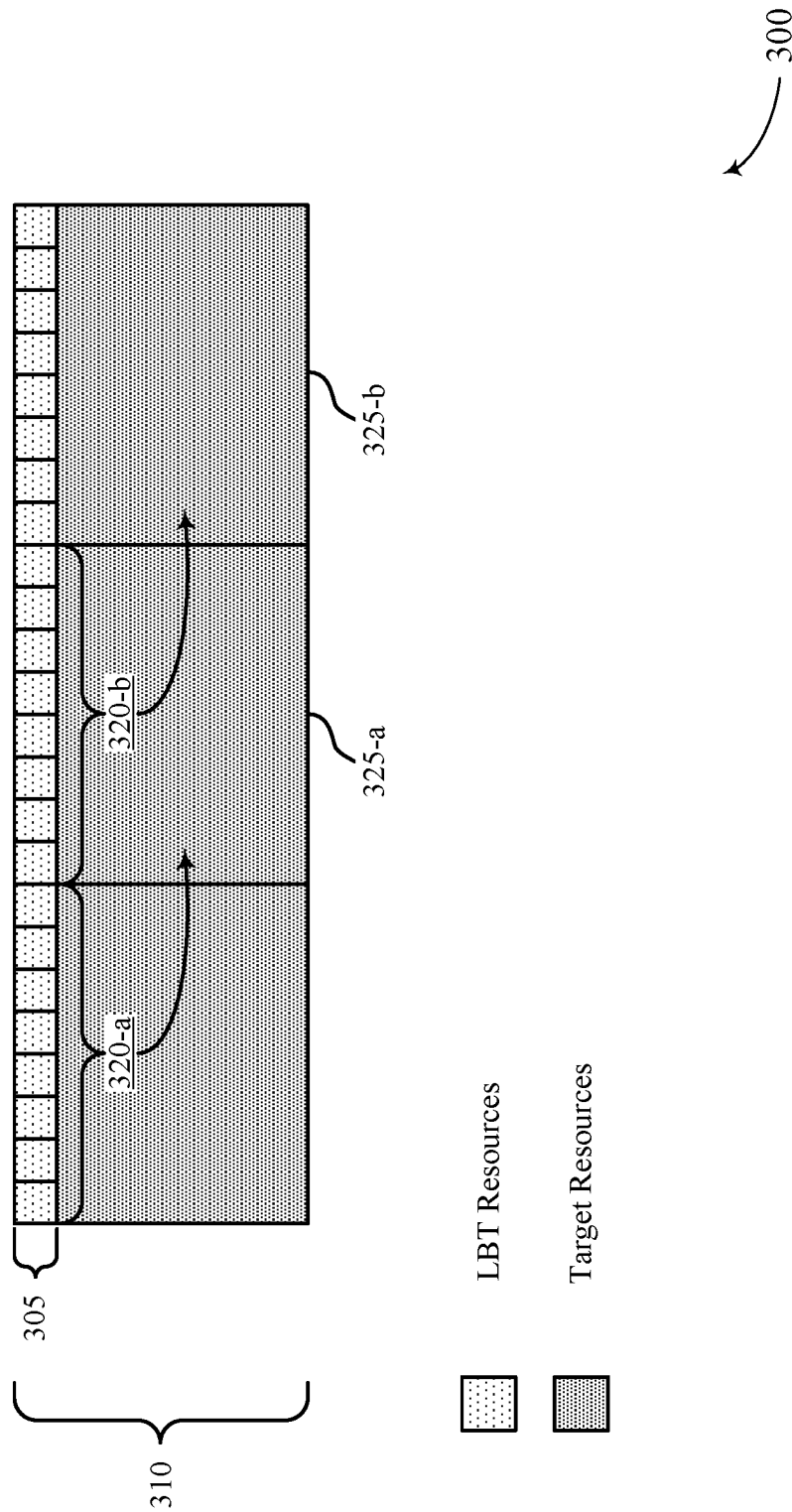
FIGS. 3 through 5 illustrate examples of resource mappings that support LBT techniques in synchronous systems in accordance with one or more aspects of the present disclosure.

FIG. 3 illustrates an example of a resource mapping 300 that supports LBT techniques in synchronous systems in accordance with one or more aspects of the present disclosure. Resource mapping 300 may be, for example, used by UEs 115 for D2D or V2X communications in a synchronous system. For example, resource mapping 300 may include a first shared RF spectrum region 305 that a UE 115 uses for an LBT procedure to access resources in a second shared RF region 310. The first shared RF spectrum region 305 may overlap with the second shared RF spectrum region 310 that may enable an efficient use of resources for LBT procedures.

The first shared RF spectrum region 305 may include multiple sets of LBT resources 320, which may, for example, include one or more sets of resource blocks that a UE 115 uses to perform energy sensing for an LBT procedure. That is, each resource block within a set of resource blocks may include signals transmitted by other wireless devices that, when sensed by the UE 115, indicate that the UE 115 may not transmit, thereby avoiding collisions with the other wireless devices. Alternatively, the resource blocks may not include signals from the other wireless devices (e.g., indicating that the medium is "idle") and the UE 115 may wait a random period (e.g., a backoff period) while continuing to perform sensing of the set of resource blocks. If the UE 115 does not detect any signals on the set of resource blocks during the random period, the UE 115 may determine that it has won contention for additional sets of resource blocks used for data transmissions. Each set of LBT resources 320 may thus correspond to a set of target resources 325 (e.g., the additional resource blocks) within the second shared RF spectrum region 310. For instance, a first set of LBT resources 320-a may correspond to a first set of target resources 325-a, a second set of LBT resources 320-b may correspond to a second set of target resources 325-b, and so forth.

Resource mapping 300 may accordingly be referred to as a pipelining of LBT resources 320 and target resources 325. As a result, when using resource mapping 300, a UE 115 may perform an LBT procedure using the first set of LBT resources 320-a in the first shared RF spectrum region 305 to attempt to win contention for the first set of target resources 325-a in the second shared RF spectrum region 310. Should the UE 115 win contention during the first set of LBT resources 320-a, the UE 115 may then transmit data on the second set of target resources 325-a. In such cases, only a portion of bandwidth may be used for the LBT procedure, thereby allowing for additional resources utilized for communicating data.

In some examples, resource mapping 300 may be configured by a network, where the size of the first shared RF spectrum region 305 (and the corresponding sets of LBT resources 315) may be determined or pre-determined by the network. In such cases, an indication of the size of the first shared RF spectrum region 305 may be transmitted by a base station 105 or by another UE 115. The network may configure the size of the first shared RF spectrum region 305, for example, based on a size of the second shared RF spectrum region used for data transmissions. In some examples, the size of the first shared RF spectrum region 305 may be fixed. Additionally or alternatively, a location may be associated with the sets of LBT resources 315, where performing an LBT procedure using the first shared RF spectrum region 305 may be limited to UEs 115 that are near another UE 115 that is transmitting on the sets of target resources 325. It is also noted that the location of the LBT resources 320 shown in resource mapping 300 is only one possible configuration, and other configurations are possible.

Figure 4:
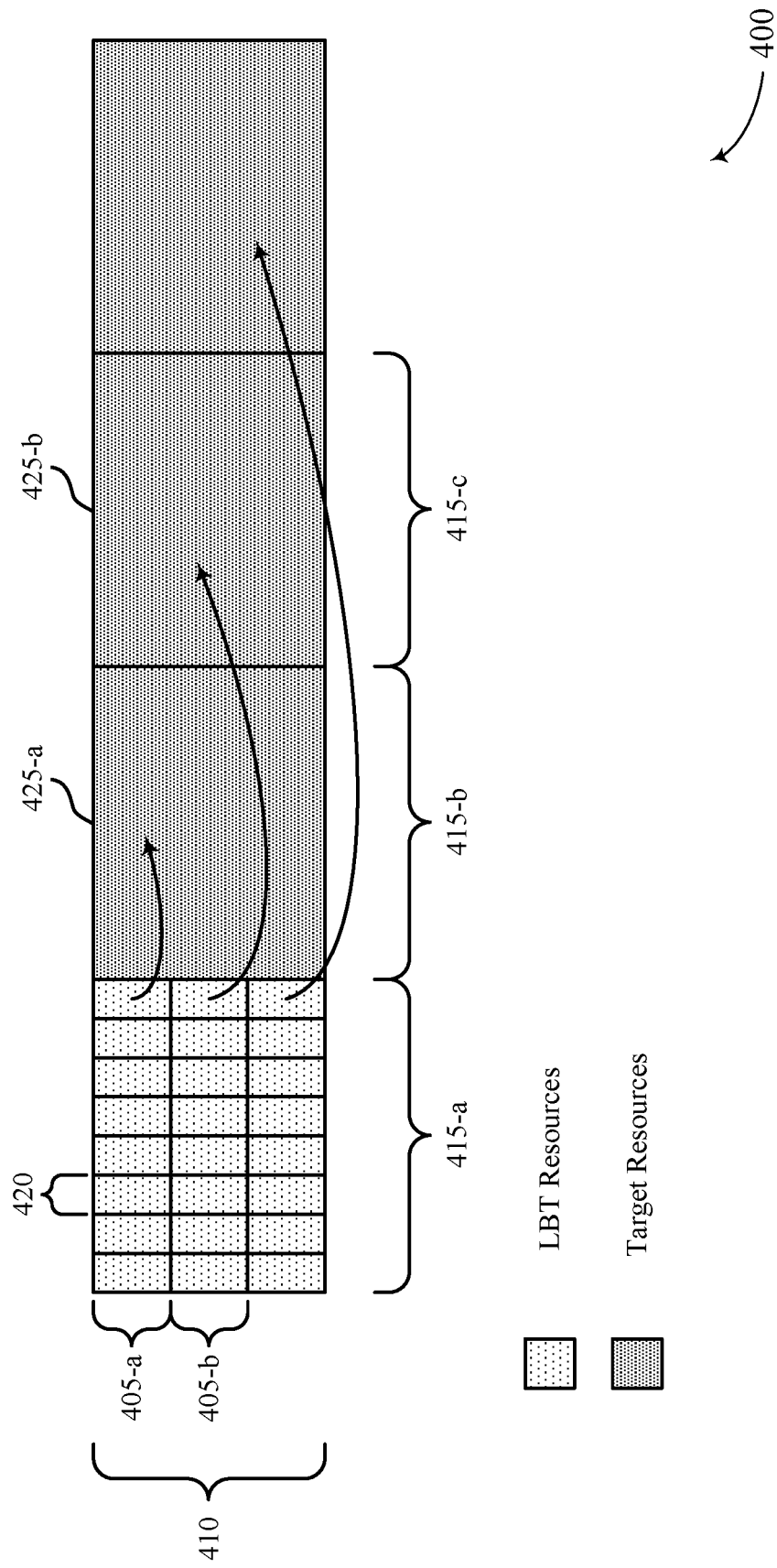

FIG. 4 illustrates an example of a resource mapping 400 that supports LBT techniques in synchronous systems in accordance with one or more aspects of the present disclosure. The resource mapping 400 may be, for example, used by UEs 115 for D2D or V2X communications in a synchronous system. The resource mapping 400 may also be, for example, used by UEs 115 for communications in a shared spectrum system. For example, resource mapping 400 may include shared RF spectrum regions 405 that a UE 115 utilizes for LBT procedures to access resources in a second shared RF spectrum region 410. In such cases, a first shared RF spectrum region 405-a and a third shared RF spectrum region 405-b may overlap in frequency with the second shared RF spectrum region 410. Resource mapping 400 may illustrate an example of resources configured to reduce a near-far effect for LBT procedures in a system.

The shared RF spectrum regions 405 in resource mapping 400 may correspond to a different time period than the second shared RF spectrum region 410. For instance, shared RF spectrum regions 405 used for LBT procedures may be included in a first time period 415-a (e.g., including the first shared RF spectrum region 405-a and the third shared RF spectrum region 405-b), where each shared spectrum region 405 overlaps within the first time period 415-a and respectively include sets of LBT resources 420. The sets of LBT resources 420 may include sets of resource blocks used for LBT procedures to contend for access to target resources 425 for the transmission of data. That is, an LBT procedure may be performed over the sets of resource blocks, where a UE 115 may determine whether signals from other wireless devices are transmitted using the sets of resource blocks. If no signals are sensed during the LBT procedure, the UE 115 may transmit data on another set of resource blocks. Accordingly, target resources 425 may be included in later time periods 415 and correspond to the second shared RF spectrum region 410.

Each shared RF spectrum region 405 used for LBT procedures may correspond to sets of target resources 425 in a different time period 415. For example, contention using the LBT resources 420 within the first shared RF spectrum region 405-a may correspond to a first set of target resources 425-a during a second time period 415-b. Additionally, the third shared RF spectrum region 405-b may correspond to a second set of target resources 425-b within a third time period 415-c. UEs 115 may thus perform LBT procedures during different sets of LBT resources 420 in different shared RF spectrum regions 405 to contend for access to sets of target resources 425 of the second shared RF spectrum region 410. In some examples, a single UE 115 may contend for access using both the first shared RF spectrum region 405-a and the third shared RF spectrum region 405-b and, if contention is won in both regions, may continuously transmit across the first set of target resources 425-*a* and the second set of target resources 425-*b* (during both the second time period 415-*b* and the third time period 415-*c*). In some examples, different UEs 115 may win contention to different sets of target resources 425.

In some cases, resource mapping 400 may be associated with a reduction in a near-far effect and little or no leakage from LBT resources 420 into target resources 425 due to the LBT resources 420 within each shared RF spectrum region 405 only overlapping with other LBT resources 420. Accordingly, a network may configure the use of resource mapping 400 based on different applications affected by an amount of near-far effect on data transmissions experienced in the system and may utilize resource mapping 400 (e.g., instead of resource mapping 300 described with reference to FIG. 3) to reduce the near-far effect. Alternatively, the network may configure the use of resource mapping 300 over resource mapping 400 if it is determined that latency reduction is of higher priority than reduction of the near-far effect.

Figure 5:
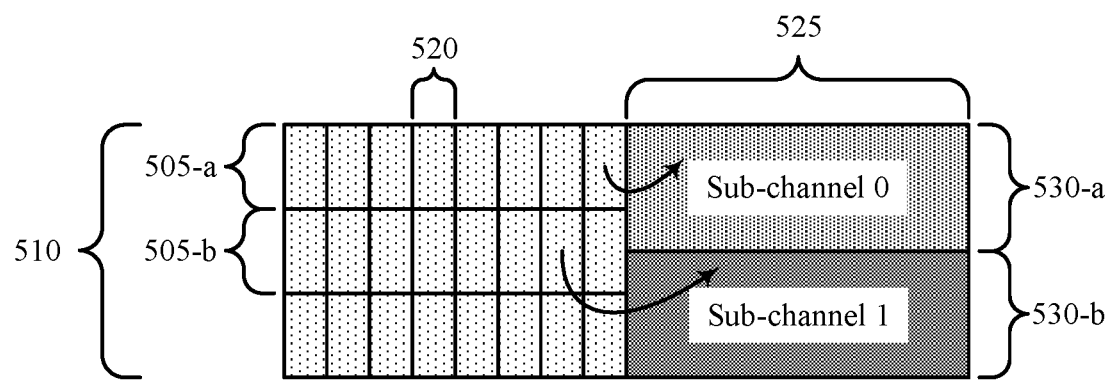
Figure 5:
Figure 5:

FIG. 5 illustrates an example of a resource mapping 500 for LBT techniques in synchronous systems in accordance with one or more aspects of the present disclosure. The resource mapping 500 may be, for example, used by UEs 115 for D2D or V2X communications in a synchronous system. For example, resource mapping 500 may include shared RF regions 505 that a UE 115 may use for LBT procedures to access resources in a second shared RF region 510. In some examples, a first shared RF spectrum region 505-*a* and a third shared RF spectrum region 505-*b* may overlap with the second shared RF spectrum region 510, which may enable a mapping of LBT resources 520 to different sub-channels of the second shared RF spectrum region 510.

The second shared RF spectrum region 510 may include a set of target resources 525 that may be divided into multiple sub-channels 530. For instance, the target resources 525 may be equally divided into a first sub-channel 530-*a* and a second sub-channel 530-*b*. In such cases, LBT resources 520 (e.g., resource blocks during which an LBT procedure is performed by sensing energy from signals transmitted by other devices on the resource blocks) within each shared RF spectrum region 505 may be mapped to different sub-channels 530. LBT resources 520 within the first shared RF spectrum region 505-*a* may correspond to target resources 525 within the first sub-channel 530-*a*, and LBT resources 520 within the third shared RF spectrum region 505-*b* may similarly correspond to shared resources 525 within the second sub-channel 530-*b*. Thus, a UE 115 may attempt to access target resources 525 in one or more sub-channels 530 by performing an LBT procedure using the corresponding LBT resources 520 in the different shared RF spectrum regions 505.

In some cases, a backoff timer used by a UE 115 may be biased in such a way that provides the UE 115 a higher likelihood of accessing more sub-bands. For example, the UE 115 may need to win contention during both the first shared RF spectrum region 505-*a* and the third shared RF spectrum region 505-*b* to transmit using both the first sub-channel 530-*a* and the second sub-channel 530-*b*, which may prevent the UE 115 from transmitting altogether if contention is not won. In such situations, the UE 115 may be able to use a smaller range of starting values for a backoff counter (e.g., as compared to another UE 115 that is contending for a single sub-channel 530), which may improve the UEs 115 ability to win contention and transmit using both sub-channels 530-*a* and 530-*b*. Alternatively, the range of starting values for the backoff counter may be different or non-overlapping for UEs 115 contending for a different number of sub-channels 530. That is, a first UE 115 attempting to access the target resources 525 in two sub-channels 530 may use a starting value within a first range (e.g. 0 to 7 symbols), and a second UE 115 contending for access to one sub-channel 530 may use a starting value in a second range (e.g., 8 to 14 symbols). Accordingly, these ranges may be configured by a network and indicated to the UEs 115.

In some examples, the LBT resources 520 in the shared RF spectrum regions 505 may correspond to multiple sub-channels 530. That is, the first shared RF spectrum region 505-*a* may be associated with two sub-channels 530 of target resources 525, the third shared RF spectrum region 505-*b* may correspond to three sub-channels 530 of target resources 525, and so on. Thus, different UEs 115 may contend for different sets of target resources 525 using the LBT resources 520 that correspond to a respective number of channels.

Figure 6:
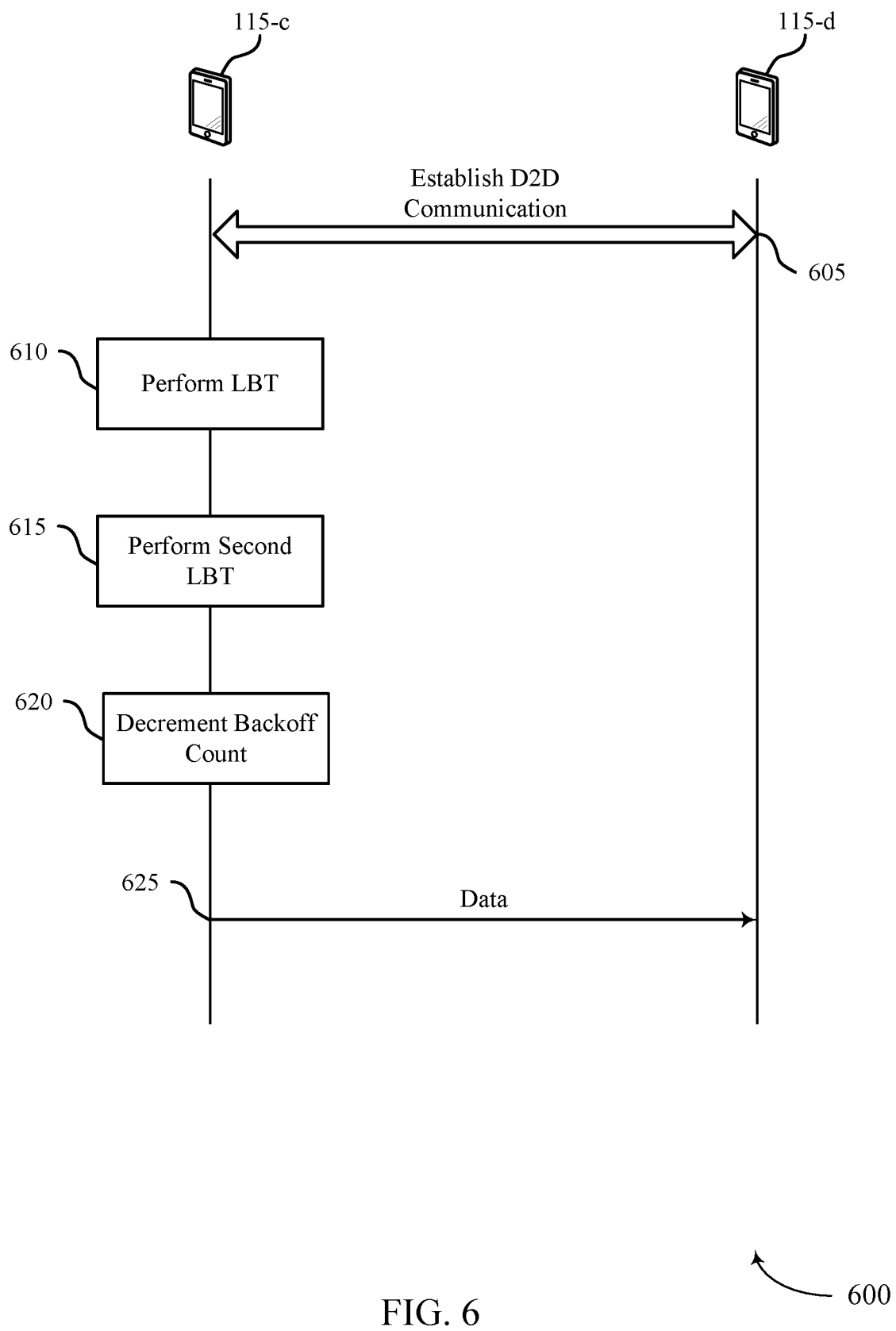
FIG. 6 illustrates an example of a process flow that supports LBT techniques in synchronous systems in accordance with one or more aspects of the present disclosure.

FIG. 6 illustrates an example of a process flow 600 for LBT techniques in synchronous systems in accordance with one or more aspects of the present disclosure. Process flow 600 may include a UE 115-*c* and a UE 115-*d*, which may be examples of the corresponding devices described with reference to FIGS. 1 and 2. For instance, UE 115-*c* and UE 115-*d* may operate in a synchronous communications system and may each autonomously access shared spectrum from D2D or V2X communication with each other. Process flow 600 may illustrate the use of LBT resources and target resources in shared RF spectrum regions of different sizes.

At 605, UE 115-*c* and UE 115-*d* may establish a D2D communications link. That is, UE 115-*d* and UE 115-*d* may be in close proximity with each other and may directly communicate by establishing a direct link for the transmission of data by each device. At 610, UE 115-*c* may perform an LBT procedure in a first shared RF spectrum region to access resources in a second shared RF spectrum region that is different than the first shared RF spectrum region. That is, UE 115-*c* may perform an energy sensing operation using LBT resources in the first shared RF spectrum region to determine whether another wireless device (e.g., including UE 115-*d*) is transmitting on target resources within the second shared RF spectrum region. In some examples, the first shared RF spectrum region may overlap in frequency with the second shared RF spectrum region, where the first shared RF spectrum region may be smaller (e.g., made up of fewer frequency bands) than the second shared RF spectrum region. In some cases, the first shared RF spectrum region may also correspond to a first time period (e.g., a TTI or subframe) and the second shared RF spectrum region corresponds to a second time period different from the first time period.

In some examples, the second shared RF spectrum region includes resources allocated in multiple sub-channels, and the LBT procedure is performed to access resources in a first sub-channel of the multiple sub-channels. In some cases, UE 115-*c* may determine a maximum transmit power for transmissions in at least one of the first shared RF spectrum region and a third shared RF spectrum region. Such a determination may, for example, be based on a configuration provided by a network. In such cases, UE 115-*c* may transmit at a transmit power lower than the maximum transmit power for transmissions in the first shared RF spectrum region and the third shared RF spectrum region based at least in part on the determined maximum transmit power. In some examples, the LBT procedure in the first shared RF spectrum region may be performed to access resources in a subset of the multiple sub-channels.

In some cases, UE 115-*c* may identify an indication of a size of the first shared RF spectrum region, where the indication is based on a size of the second shared RF spectrum region, an energy measurement criterion, or both. In such cases, the network may configure the size of the first shared RF spectrum, and information regarding the size of the first shared RF spectrum region may be communicated to UE 115-*c* (and/or UE 115-*d*) by the network (e.g., via a base station 105). UE 115-*c* may accordingly select the size of the first shared RF spectrum region based on the received indication.

At 615, UE 115-*c* may perform a second LBT procedure in the third shared RF spectrum region to access resources in a fourth shared RF spectrum region. In some cases, the third shared RF spectrum region may overlap in time with the first shared RF spectrum region, and the third shared RF spectrum region may correspond to a third time period with the fourth shared RF spectrum region corresponding to a fourth time period different from the third time period. Additionally or alternatively, UE 115-*c* may perform the second LBT procedure during the LBT procedure using the third shared RF spectrum region to access resources in a second sub-channel of the multiple sub-channels, where the third shared RF spectrum region overlaps in time with the first shared RF spectrum region.

At 620, UE 115-*c* may decrement a backoff count associated with the LBT procedure and the second LBT procedure. A starting value for the backoff count may be determined by UE 115-*c* based on an indicated range of starting values. In such cases, the range of starting values may be based on a number of resources UE 115-*c* intends to use for transmitting data. For instance, UE 115-*c* may contend for use of multiple target resources in the second shared RF spectrum region (or the fourth shared RF spectrum region) and may use a range of values for the backoff count that may enable UE 115-*c* a higher likelihood of winning contention for the multiple target resources. In some examples, the backoff count may be the same for multiple LBT procedures initiated by UE 115-*c*. Additionally, the range of starting values used by UE 115-*c* may be configured by the network and may thus be indicated to UE 115-*c* (and/or UE 115-*d*).

At 625, UE 115-*c* may transmit data using the resources in the second shared RF spectrum region based on the LBT procedure. That is, UE 115-*c* may win contention for a set of target resources in the second shared RF spectrum region during LBT resources in the first shared RF spectrum band, and UE 115-*c* may subsequently transmit on the target resources based on winning contention. Additionally, UE 115-*c* may transmit data using the resources in the fourth shared RF spectrum region based at least in part on the performed second LBT procedure (e.g., based on winning contention during the second LBT procedure). When transmitting data using the resources in the fourth shared RF spectrum region and using the resources in the second shared RF spectrum region, UE 115-*c* may transmit data continuously across the resources in the second shared RF spectrum region and the resources in the fourth shared RF spectrum region.

In some examples, UE 115-*c* may transmit data using the resources in the first sub-channel and resources in the second sub-channel based on the performed second LBT procedure. In some cases, transmitting data using the resources in the first sub-channel and transmitting data using the resources in the second sub-channel are based on the backoff count reaching a value (e.g., zero).

Figure 7:
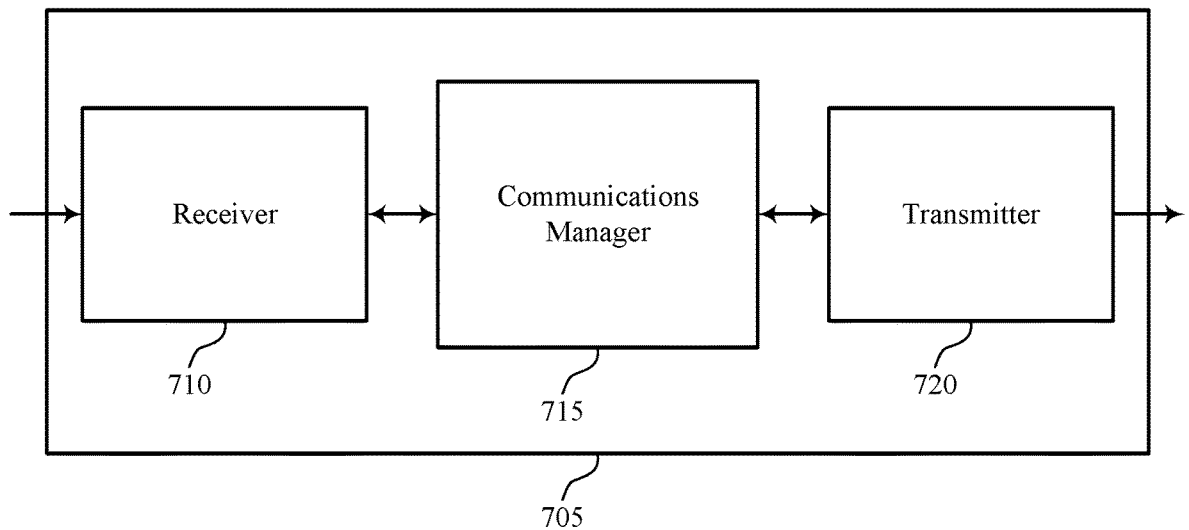
FIGS. 7 through 9 show block diagrams of a device that supports LBT techniques in synchronous systems in accordance with one or more aspects of the present disclosure.

FIG. 7 shows a block diagram 700 of a wireless device 705 that supports LBT techniques in synchronous systems in accordance with one or more aspects of the present disclosure. Wireless device 705 may be an example of aspects of a UE 115 as described with reference to FIG. 1. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to LBT techniques in synchronous systems, etc.). Information may be passed on to other components of the device. The receiver 710 may be an example of aspects of the transceiver 1035 described with reference to FIG. 10.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Communications manager 715 may perform, in a synchronous communications system, an LBT procedure in a first shared RF spectrum region to access resources in a second shared RF spectrum region that is different than the first shared RF spectrum region and transmit data using the resources in the second shared RF spectrum region based on the performed LBT procedure.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
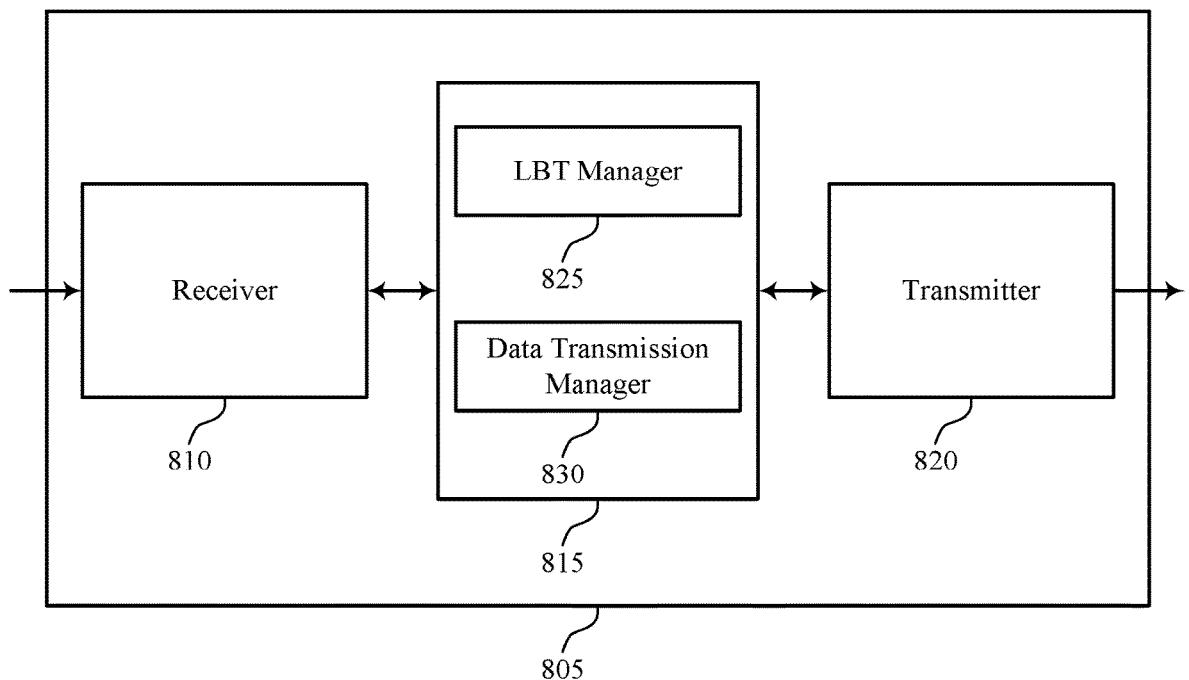

FIG. 8 shows a block diagram 800 of a wireless device 805 that supports LBT techniques in synchronous systems in accordance with one or more aspects of the present disclosure. Wireless device 805 may be an example of aspects of a wireless device 705 or a UE 115 as described with reference to FIGS. 1 and 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to LBT techniques in synchronous systems, etc.). Information may be passed on to other components of the device. The receiver 810 may be an example of aspects of the transceiver 1035 described with reference to FIG. 10.

Communications manager 815 may be an example of aspects of the communications manager 1015 described with reference to FIG. 10. In some cases, communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to a receiver, a transmitter, a transceiver, one or more other components described in the present disclosure, or a combination thereof in accordance with various aspects of the present disclosure. Communications manager 815 may also include LBT manager 825 and data transmission manager 830.

LBT manager 825 may perform, in a synchronous communications system, an LBT procedure in a first shared RF spectrum region to access resources in a second shared RF spectrum region that is different than the first shared RF spectrum region. LBT manager 825 may also perform a second LBT procedure in a third shared RF spectrum region to access resources in a fourth shared RF spectrum region, where the third shared RF spectrum region overlaps in time with the first shared RF spectrum region, and where the third shared RF spectrum region corresponds to a third time period and the fourth shared RF spectrum region corresponds to a fourth time period different from the third time period.

Additionally or alternatively, LBT manager 825 may perform, during the LBT procedure, a second LBT procedure in a third shared RF spectrum region to access resources in a second sub-channel of the multiple sub-channels, where the third shared RF spectrum region overlaps in time with the first shared RF spectrum region. In some cases, the first shared RF spectrum region overlaps in frequency with the second shared RF spectrum region. In some cases, the first shared RF spectrum region corresponds to a first time period and the second shared RF spectrum region corresponds to a second time period different from the first time period. In some examples, the second shared RF spectrum region may include resources allocated in multiple sub-channels, and the LBT procedure may be performed to access resources in a first sub-channel of the multiple sub-channels. In some cases, a size of the first shared RF spectrum region is smaller than a size of the second shared RF spectrum region. In some cases, the second shared RF spectrum region includes resources allocated in multiple sub-channels, and where the LBT procedure in the first shared RF spectrum region is performed to access resources in a subset of the multiple sub-channels.

Data transmission manager 830 may transmit data using the resources in the second shared RF spectrum region based on the performed LBT procedure, transmit data using the resources in the fourth shared RF spectrum region based on the performed second LBT procedure, and transmit data using the resources in the first sub-channel and resources in the second sub-channel based on the performed second LBT procedure. In some cases, transmitting data using the resources in the fourth shared RF spectrum region and using the resources in the second shared RF spectrum region includes transmitting data continuously across the resources in the second shared RF spectrum region and the resources in the fourth shared RF spectrum region.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
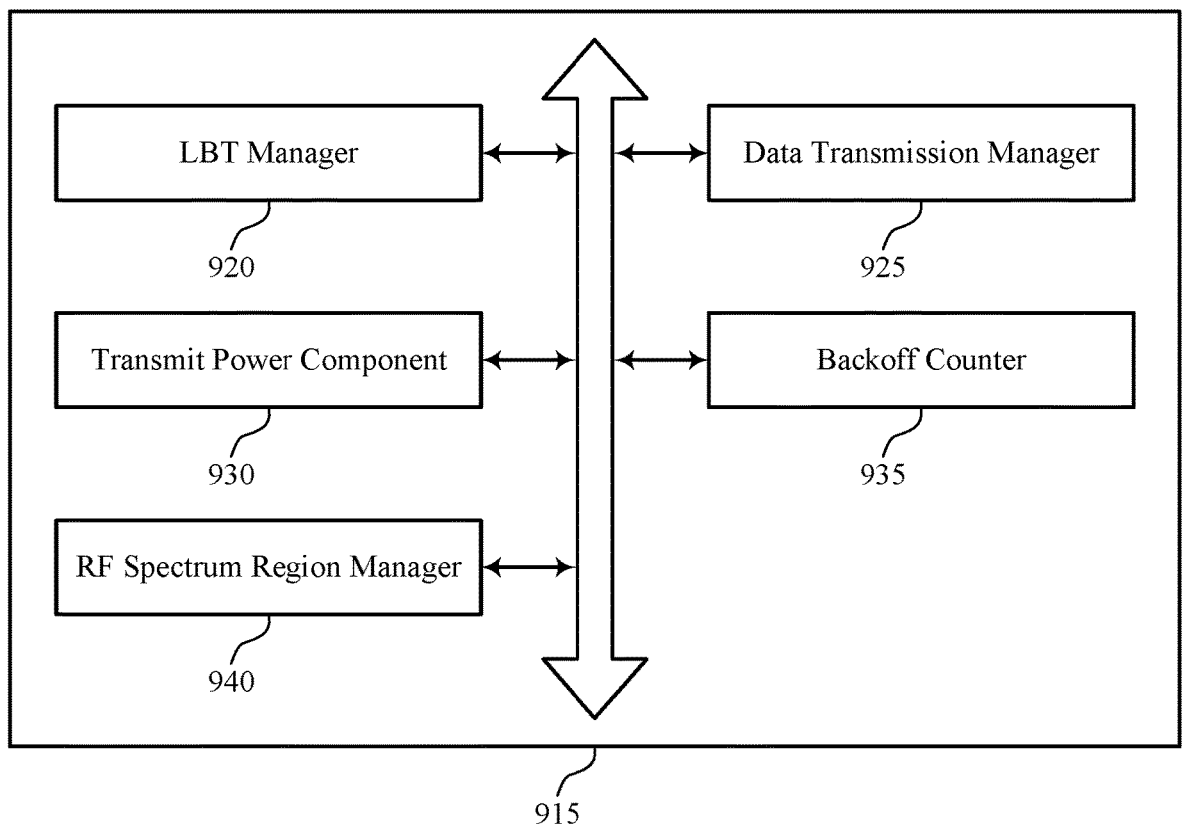

FIG. 9 shows a block diagram 900 of a communications manager 915 that supports LBT techniques in synchronous systems in accordance with one or more aspects of the present disclosure. The communications manager 915 may be an example of aspects of a communications manager 715, a communications manager 815, or a communications manager 1015 described with reference to FIGS. 7, 8, and 10. For example, communications manager 915 and/or at least some of its various sub-components may be implemented in hardware, software executed by a processor, firmware, or any combination thereof. If implemented in software executed by a processor, the functions of the communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915 and/or at least some of its various sub-components may be physically located at various positions, including being distributed such that portions of functions are implemented at different physical locations by one or more physical devices. In some examples, communications manager 915 and/or at least some of its various sub-components may be a separate and distinct component in accordance with various aspects of the present disclosure. In other examples, communications manager 915 and/or at least some of its various sub-components may be combined with one or more other hardware components, including but not limited to a receiver, a transmitter, a transceiver, one or more other components described in the present disclosure, or a combination thereof in accordance with various aspects of the present disclosure. The communications manager 915 may include LBT manager 920, data transmission manager 925, transmit power component 930, backoff counter 935, and RF spectrum region manager 940. Each of these modules may communicate, directly or indirectly, with one another (e.g., via one or more buses).

LBT manager 920 may perform, in a synchronous communications system, an LBT procedure in a first shared RF spectrum region to access resources in a second shared RF spectrum region that is different than the first shared RF spectrum region. LBT manager 920 may also perform a second LBT procedure in a third shared RF spectrum region to access resources in a fourth shared RF spectrum region, where the third shared RF spectrum region overlaps in time with the first shared RF spectrum region, and where the third shared RF spectrum region corresponds to a third time period and the fourth shared RF spectrum region corresponds to a fourth time period different from the third time period.

Additionally or alternatively, LBT manager 920 may perform, during the LBT procedure, a second LBT procedure in a third shared RF spectrum region to access resources in a second sub-channel of the multiple sub-channels, where the third shared RF spectrum region overlaps in time with the first shared RF spectrum region. In some cases, the first shared RF spectrum region overlaps in frequency with the second shared RF spectrum region. In some cases, the first shared RF spectrum region corresponds to a first time period and the second shared RF spectrum region corresponds to a second time period different from the first time period. In some examples, the second shared RF spectrum region may include resources allocated in multiple sub-channels, and the LBT procedure may be performed to access resources in a first sub-channel of the multiple sub-channels. In some cases, a size of the first shared RF spectrum region is smaller than a size of the second shared RF spectrum region. In some cases, the second shared RF spectrum region includes resources allocated in multiple sub-channels, and where the LBT procedure in the first shared RF spectrum region is performed to access resources in a subset of the multiple sub-channels.

Data transmission manager 925 may transmit data using the resources in the second shared RF spectrum region based on the performed LBT procedure, transmit data using the resources in the fourth shared RF spectrum region based on the performed second LBT procedure, and transmit data using the resources in the first sub-channel and resources in the second sub-channel based on the performed second LBT procedure. In some cases, transmitting data using the resources in the fourth shared RF spectrum region and using the resources in the second shared RF spectrum region includes transmitting data continuously across the resources in the second shared RF spectrum region and the resources in the fourth shared RF spectrum region.

Transmit power component 930 may determine a maximum transmit power for transmissions in at least one of the first shared RF spectrum region and the third shared RF spectrum region and transmit, at a transmit power lower than the maximum transmit power, using the first shared RF spectrum region and the third shared RF spectrum region based on the determined maximum transmit power.

Backoff counter 935 may decrement a backoff count associated with the LBT procedure and the second LBT procedure, where transmitting data using the resources in the first sub-channel and transmitting data using the resources in the second sub-channel are based on the backoff count reaching a value. In some examples, backoff counter 935 may identify an indication of a range of starting values for the backoff count, where the range of starting values is based on a number of resources used for transmitting data, and select a starting value for the backoff count based on the received indication of the range of starting values. RF spectrum region manager 940 may identify an indication of a size of the first shared RF spectrum region, where the indication is based on a size of the second shared RF spectrum region, an energy measurement criterion, or both and select the size of the first shared RF spectrum region based on the received indication.

Figure 10:
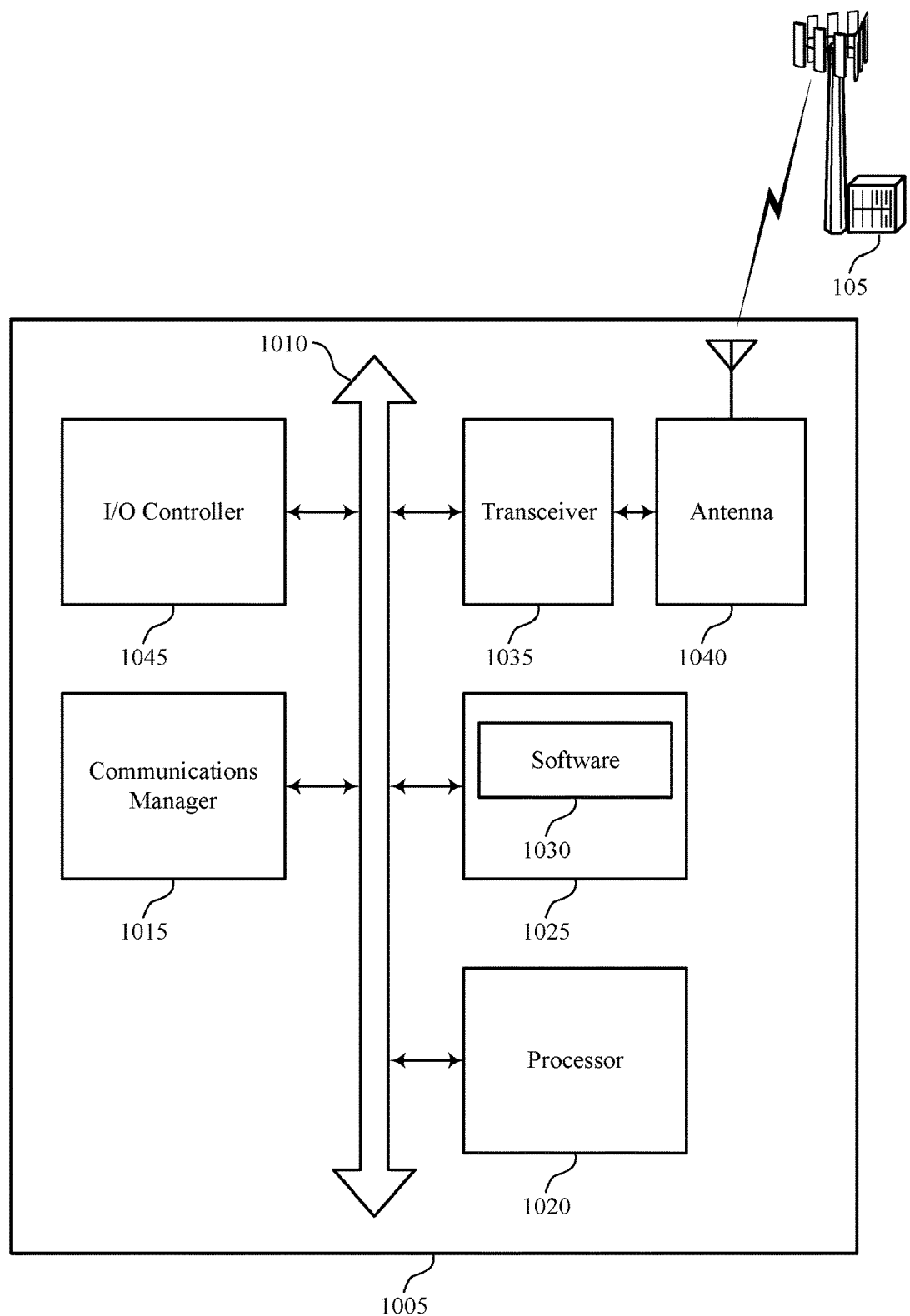
FIG. 10 illustrates a block diagram of a system including a UE that supports LBT techniques in synchronous systems in accordance with one or more aspects of the present disclosure.

FIG. 10 shows a diagram of a system 1000 including a device 1005 that supports LBT techniques in synchronous systems in accordance with one or more aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting LBT techniques in synchronous systems).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support LBT techniques in synchronous systems. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
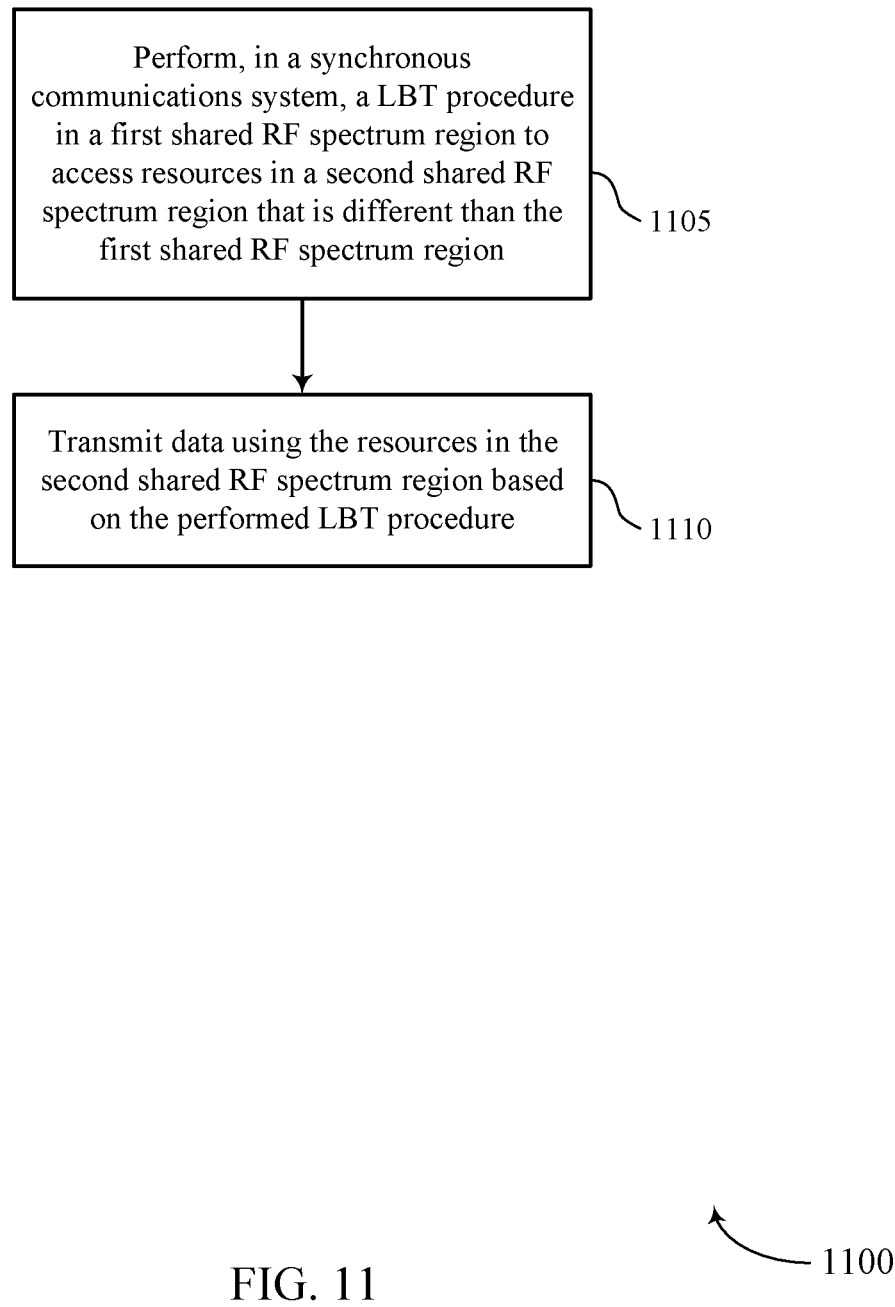
FIGS. 11 through 14 illustrate methods for LBT techniques in synchronous systems in accordance with one or more aspects of the present disclosure.

FIG. 11 shows a flowchart illustrating a method 1100 for LBT techniques in synchronous systems in accordance with one or more aspects of the present disclosure. The operations of method 1100 may be implemented by a UE 115 or its components as described herein. For example, the operations of method 1100 may be performed by a communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may perform, in a synchronous communications system, an LBT procedure in a first shared RF spectrum region to access resources in a second shared RF spectrum region that is different than the first shared RF spectrum region. The operations of block 1105 may be performed according to the methods described with reference to FIGS. 1 through 6. In certain examples, aspects of the operations of block 1105 may be performed by an LBT manager as described with reference to FIGS. 7 through 10.

At block 1110 the UE 115 may transmit data using the resources in the second shared RF spectrum region based at least in part on the performed LBT procedure. The operations of block 1110 may be performed according to the methods described with reference to FIGS. 1 through 6. In certain examples, aspects of the operations of block 1110 may be performed by a data transmission manager as described with reference to FIGS. 7 through 10.

Figure 12:
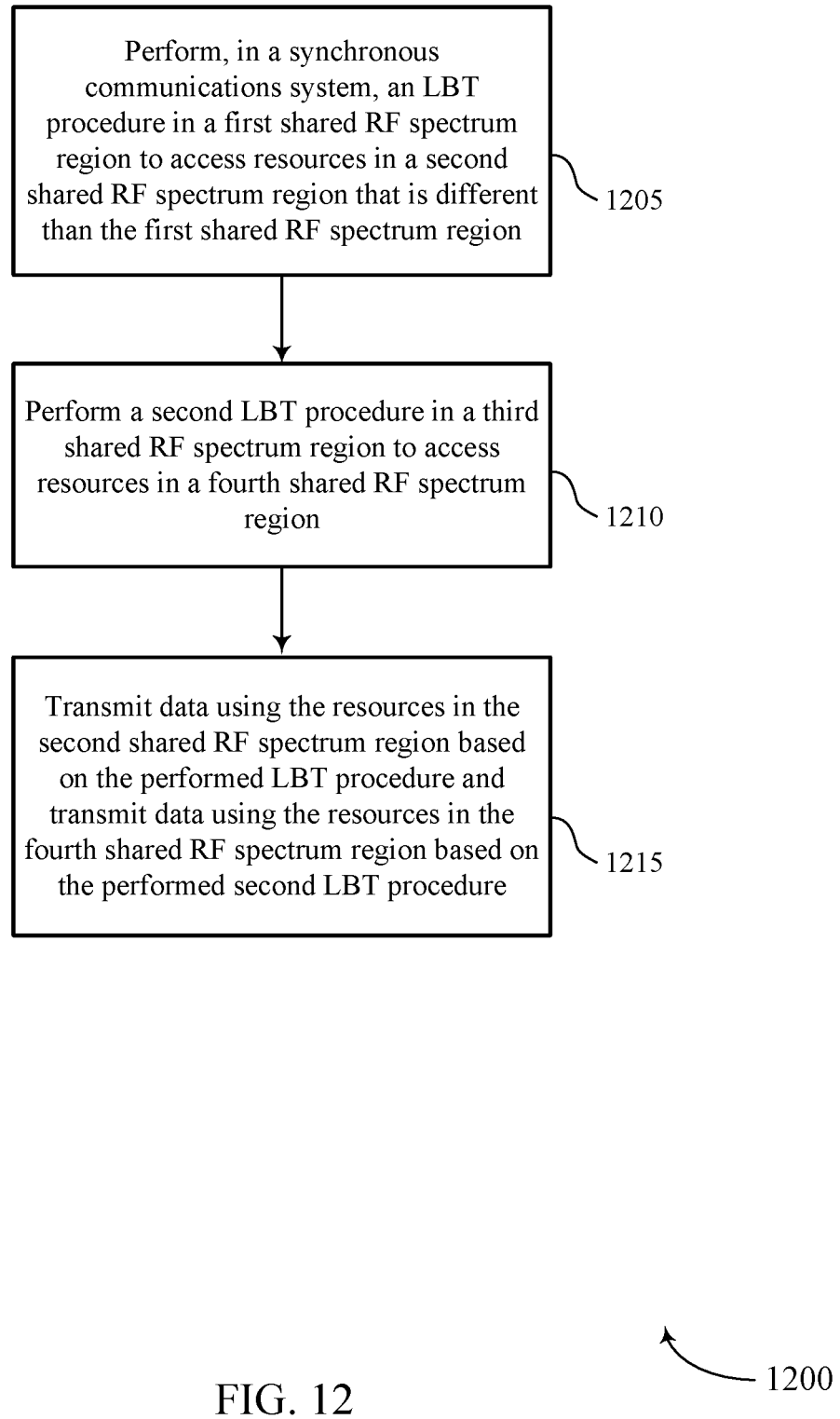

FIG. 12 shows a flowchart illustrating a method 1200 for LBT techniques in synchronous systems in accordance with one or more aspects of the present disclosure. The operations of method 1200 may be implemented by a UE 115 or its components as described herein. For example, the operations of method 1200 may be performed by a communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may perform, in a synchronous communications system, an LBT procedure in a first shared RF spectrum region to access resources in a second shared RF spectrum region that is different than the first shared RF spectrum region. The operations of block 1205 may be performed according to the methods described with reference to FIGS. 1 through 6. In certain examples, aspects of the operations of block 1205 may be performed by an LBT manager as described with reference to FIGS. 7 through 10.

At block 1210 the UE 115 may perform a second LBT procedure in a third shared RF spectrum region to access resources in a fourth shared RF spectrum region, where the third shared RF spectrum region overlaps in time with the first shared RF spectrum region, and where the third shared RF spectrum region corresponds to a third time period and the fourth shared RF spectrum region corresponds to a fourth time period different from the third time period. The operations of block 1210 may be performed according to the methods described with reference to FIGS. 1 through 6. In certain examples, aspects of the operations of block 1210 may be performed by an LBT manager as described with reference to FIGS. 7 through 10.

At block 1215 the UE 115 may transmit data using the resources in the second shared RF spectrum region based at least in part on the performed LBT procedure and transmit data using the resources in the fourth shared RF spectrum region based at least in part on the performed second LBT procedure. The operations of block 1215 may be performed according to the methods described with reference to FIGS. 1 through 6. In certain examples, aspects of the operations of block 1215 may be performed by a data transmission manager as described with reference to FIGS. 7 through 10.

Figure 13:
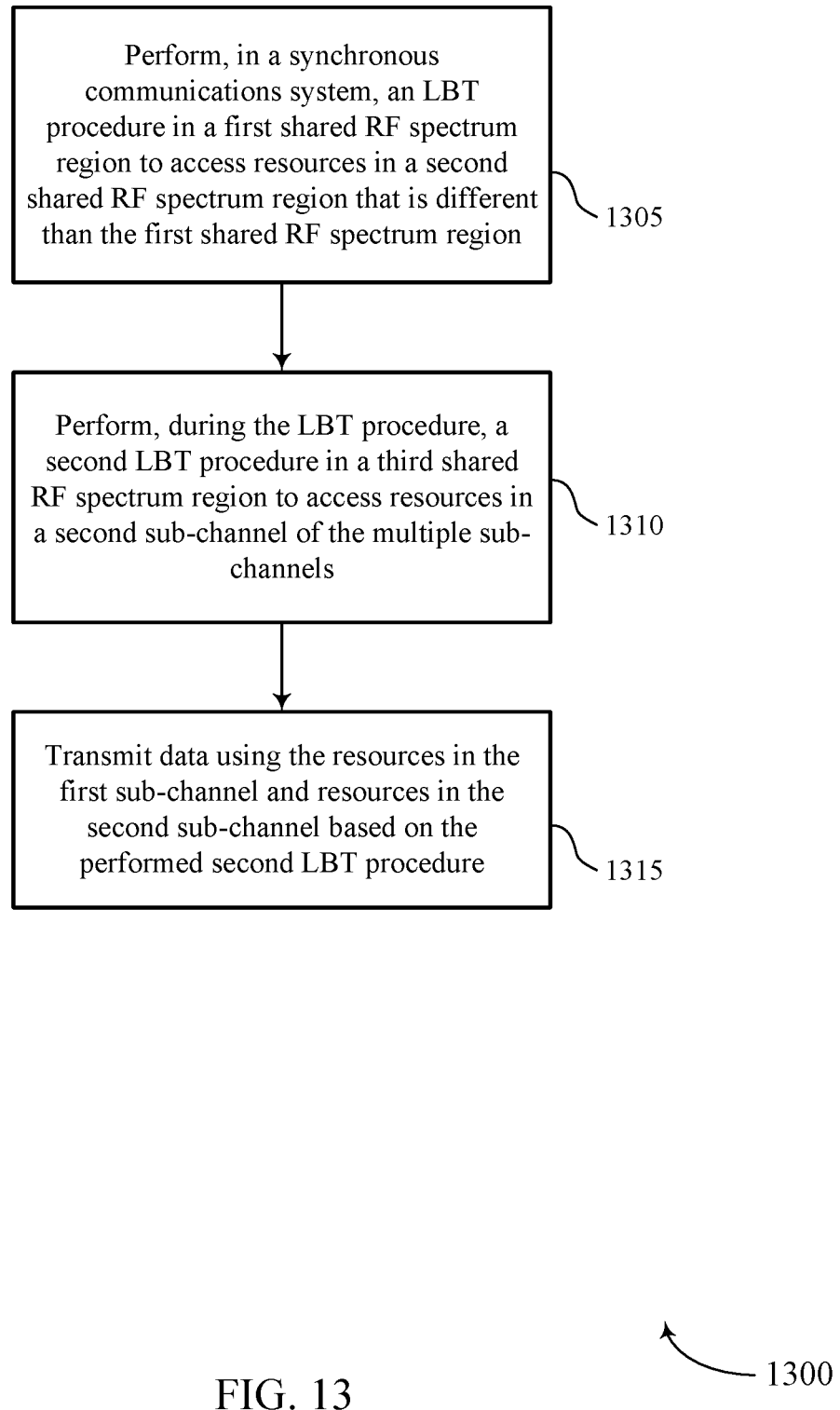

FIG. 13 shows a flowchart illustrating a method 1300 for LBT techniques in synchronous systems in accordance with one or more aspects of the present disclosure. The operations of method 1300 may be implemented by a UE 115 or its components as described herein. For example, the operations of method 1300 may be performed by a communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may perform, in a synchronous communications system, an LBT procedure in a first shared RF spectrum region to access resources in a second shared RF spectrum region that is different than the first shared RF spectrum region. In some cases, the second shared RF spectrum region includes resources allocated in multiple sub-channels, and the LBT procedure is performed to access resources in a first sub-channel of the multiple sub-channels. The operations of block 1305 may be performed according to the methods described with reference to FIGS. 1 through 6. In certain examples, aspects of the operations of block 1305 may be performed by an LBT manager as described with reference to FIGS. 7 through 10.

At block 1310 the UE 115 may perform, during the LBT procedure, a second LBT procedure in a third shared RF spectrum region to access resources in a second sub-channel of the multiple sub-channels, where the third shared RF spectrum region overlaps in time with the first shared RF spectrum region. The operations of block 1310 may be performed according to the methods described with reference to FIGS. 1 through 6. In certain examples, aspects of the operations of block 1310 may be performed by an LBT manager as described with reference to FIGS. 7 through 10.

At block 1315 the UE 115 may transmit data using the resources in the first sub-channel and resources in the second sub-channel based at least in part on the performed second LBT procedure. The operations of block 1315 may be performed according to the methods described with reference to FIGS. 1 through 6. In certain examples, aspects of the operations of block 1315 may be performed by a data transmission manager as described with reference to FIGS. 7 through 10.

Figure 14:
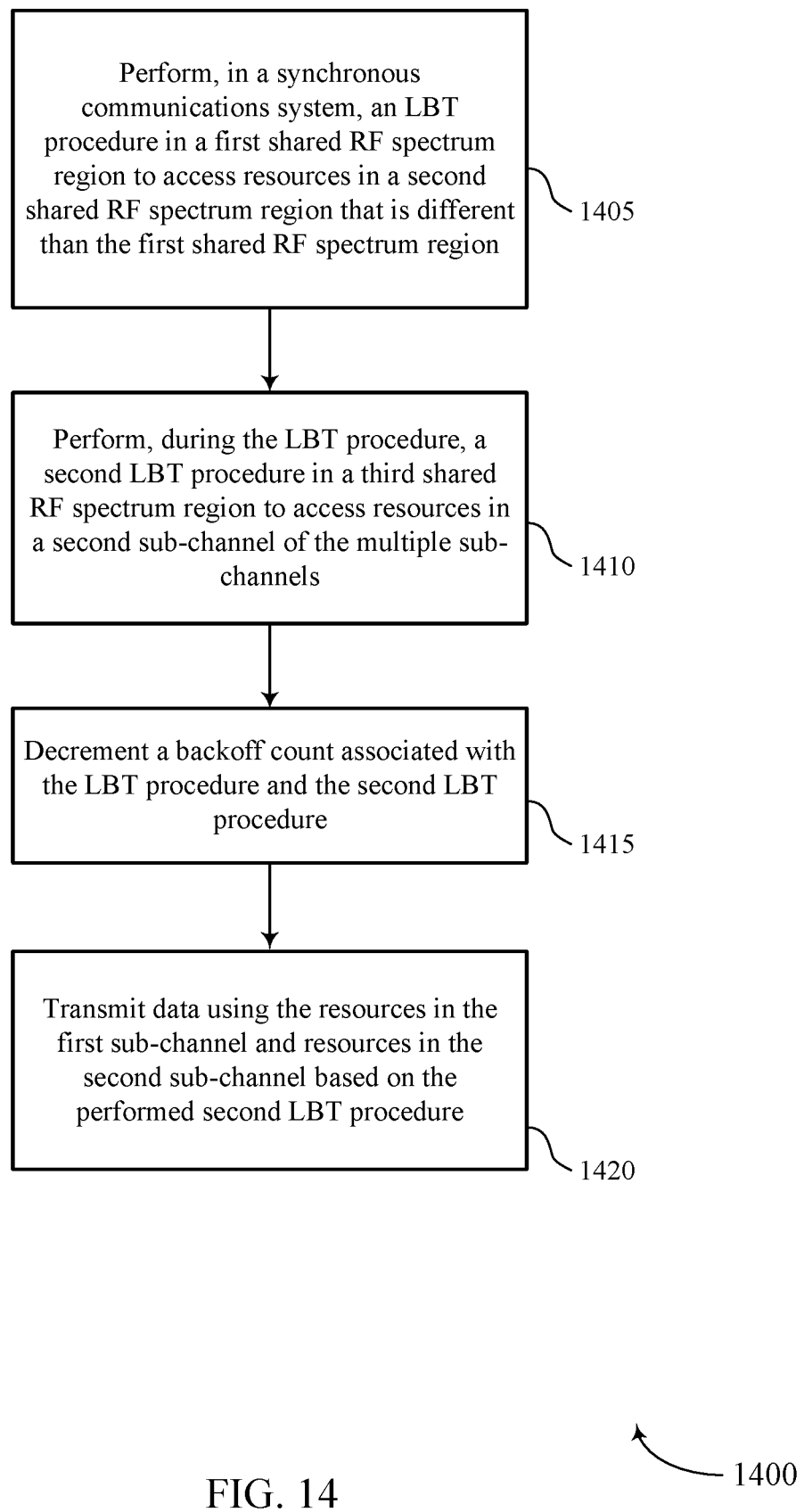

FIG. 14 shows a flowchart illustrating a method 1400 for LBT techniques in synchronous systems in accordance with one or more aspects of the present disclosure. The operations of method 1400 may be implemented by a UE 115 or its components as described herein. For example, the operations of method 1400 may be performed by a communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may perform, in a synchronous communications system, an LBT procedure in a first shared RF spectrum region to access resources in a second shared RF spectrum region that is different than the first shared RF spectrum region. In some examples, the second shared RF spectrum region includes resources allocated in multiple sub-channels, and the LBT procedure is performed to access resources in a first sub-channel of the multiple sub-channels. The operations of block 1405 may be performed according to the methods described with reference to FIGS. 1 through 6. In certain examples, aspects of the operations of block 1405 may be performed by an LBT manager as described with reference to FIGS. 7 through 10.

At block 1410 the UE 115 may perform, during the LBT procedure, a second LBT procedure in a third shared RF spectrum region to access resources in a second sub-channel of the multiple sub-channels, where the third shared RF spectrum region overlaps in time with the first shared RF spectrum region. The operations of block 1410 may be performed according to the methods described with reference to FIGS. 1 through 6. In certain examples, aspects of the operations of block 1410 may be performed by an LBT manager as described with reference to FIGS. 7 through 10.

At block 1415 the UE 115 may decrement a backoff count associated with the LBT procedure and the second LBT procedure. The operations of block 1415 may be performed according to the methods described with reference to FIGS. 1 through 6. In certain examples, aspects of the operations of block 1415 may be performed by a backoff counter as described with reference to FIGS. 7 through 10.

At block 1420 the UE 115 may transmit data using the resources in the first sub-channel and resources in the second sub-channel based at least in part on the performed second LBT procedure, where transmitting data using the resources in the first sub-channel and transmitting data using the resources in the second sub-channel are based at least in part on the backoff count reaching a value. The operations of block 1420 may be performed according to the methods described with reference to FIGS. 1 through 6. In certain examples, aspects of the operations of block 1420 may be performed by a data transmission manager as described with reference to FIGS. 7 through 10.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP (LTE and LTE-A are releases of Universal Mobile Telecommunications System (UMTS) that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
performing, by a user equipment (UE) in a synchronous communications system, a listen-before-talk (LBT) procedure in a first shared radio frequency (RF) spectrum region comprising a first set of time and frequency resources to access a second set of time and frequency resources in a second shared RF spectrum region that is different than the first shared RF spectrum region, the first shared RF spectrum region having a smaller number of RF spectrum bands than the second shared RF spectrum region, wherein the first shared RF spectrum region and the second shared RF spectrum region are within a same channel;

determining that the second shared RF spectrum region is available based at least in part on the performed LBT procedure in the first shared RF spectrum region; and transmitting data using the second set of time and frequency resources in the second shared RF spectrum region based at least in part on the determination.

2. The method of claim 1, wherein the first shared RF spectrum region overlaps in frequency with the second shared RF spectrum region.

3. The method of claim 2, wherein the first shared RF spectrum region corresponds to a first time period and the second shared RF spectrum region corresponds to a second time period different from the first time period.

4. The method of claim 1, further comprising:

performing a second LBT procedure in a third shared RF spectrum region comprising a third set of time and frequency resources to access a fourth set of time and frequency resources in a fourth shared RF spectrum region, wherein the third shared RF spectrum region overlaps in time with the first shared RF spectrum region, and wherein the third shared RF spectrum region corresponds to a third time period and the fourth shared RF spectrum region corresponds to a fourth time period different from the third time period; and transmitting data using the fourth set of time and frequency resources in the fourth shared RF spectrum region based at least in part on the performed second LBT procedure.

5. The method of claim 4, wherein transmitting data using the fourth set of time and frequency resources in the fourth shared RF spectrum region and using the second set of time and frequency resources in the second shared RF spectrum region comprises:

transmitting data continuously across the second set of time and frequency resources in the second shared RF spectrum region and the fourth set of time and frequency resources in the fourth shared RF spectrum region.

6. The method of claim 1, wherein the second shared RF spectrum region comprises resources allocated in multiple sub-channels, and wherein the LBT procedure is performed to access resources in a first sub-channel of the multiple sub-channels, the method further comprising:

performing, during the LBT procedure, a second LBT procedure in a third shared RF spectrum region to access resources in a second sub-channel of the multiple sub-channels, wherein the third shared RF spectrum region overlaps in time with the first shared RF spectrum region; and transmitting data using the resources in the first sub-channel and resources in the second sub-channel based at least in part on the performed second LBT procedure.

7. The method of claim 6, further comprising:

determining a maximum transmit power for transmissions in at least one of the first shared RF spectrum region and the third shared RF spectrum region; and transmitting, at a transmit power lower than the maximum transmit power, using the first shared RF spectrum region and the third shared RF spectrum region based at least in part on the determined maximum transmit power.

8. The method of claim 6, further comprising:

decrementing a backoff count associated with the LBT procedure and the second LBT procedure, wherein transmitting data using the resources in the first sub-channel and transmitting data using the resources in the second sub-channel are based at least in part on the backoff count reaching a value.

9. The method of claim 8, further comprising:

identifying an indication of a range of starting values for the backoff count, wherein the range of starting values is based at least in part on a number of resources used for transmitting data; and selecting a starting value for the backoff count based at least in part on the received indication of the range of starting values.

10. The method of claim 1, further comprising:

identifying an indication of a size of the first shared RF spectrum region, wherein the indication is based at least in part on a size of the second shared RF spectrum region, an energy measurement criterion, or both; and selecting the size of the first shared RF spectrum region based at least in part on the received indication.

11. The method of claim 1, wherein a size of the first shared RF spectrum region is smaller than a size of the second shared RF spectrum region.

12. The method of claim 1, wherein the second shared RF spectrum region comprises resources allocated in multiple sub-channels, and wherein the LBT procedure in the first shared RF spectrum region is performed to access resources in a subset of the multiple sub-channels.

13. An apparatus for wireless communication, comprising:

means for performing, by a user equipment (UE) in a synchronous communications system, a listen-before-talk (LBT) procedure in a first shared radio frequency (RF) spectrum region comprising a first set of time and frequency resources to access a second set of time and frequency resources in a second shared RF spectrum region that is different than the first shared RF spectrum region, the first shared RF spectrum region having a smaller number of RF spectrum bands than the second shared RF spectrum region, wherein the first shared RF spectrum region and the second shared RF spectrum region are within a same channel;

means for determining that the second shared RF spectrum region is available based at least in part on the performed LBT procedure in the first shared RF spectrum region; and means for transmitting data using the second set of time and frequency resources in the second shared RF spectrum region based at least in part on the determination.

14. The apparatus of claim 13, wherein the first shared RF spectrum region overlaps in frequency with the second shared RF spectrum region.

15. The apparatus of claim 14, wherein the first shared RF spectrum region corresponds to a first time period and the second shared RF spectrum region corresponds to a second time period different from the first time period.

16. The apparatus of claim 13, further comprising:

means for performing a second LBT procedure in a third shared RF spectrum region comprising a third set of time and frequency resources to access a fourth set of time and frequency resources in a fourth shared RF spectrum region, wherein the third shared RF spectrum region overlaps in time with the first shared RF spectrum region, and wherein the third shared RF spectrum region corresponds to a third time period and the fourth shared RF spectrum region corresponds to a fourth time period different from the third time period; and
means for transmitting data using the fourth set of time and frequency resources in the fourth shared RF spectrum region based at least in part on the performed second LBT procedure.

17. The apparatus of claim 16, wherein the means for transmitting data using the fourth set of time and frequency resources in the fourth shared RF spectrum region and using the second set of time and frequency resources in the second shared RF spectrum region comprise:
means for transmitting data continuously across the second set of time and frequency resources in the second shared RF spectrum region and the fourth set of time and frequency resources in the fourth shared RF spectrum region.

18. An apparatus for wireless communication, in a system comprising:
a processor;
memory in electronic communication with the processor; and
the processor and memory configured to:
perform, by a user equipment (UE) in a synchronous communications system, a listen-before-talk (LBT) procedure in a first shared radio frequency (RF) spectrum region comprising a first set of time and frequency resources to access a second set of time and frequency resources in a second shared RF spectrum region that is different than the first shared RF spectrum region, the first shared RF spectrum region having a smaller number of RF spectrum bands than the second shared RF spectrum region, wherein the first shared RF spectrum region and the second shared RF spectrum region are within a same channel;
determine that the second shared RF spectrum region is available based at least in part on the performed LBT procedure in the first shared RF spectrum region; and
transmit data using the second set of time and frequency resources in the second shared RF spectrum region based at least in part on the determination.

19. The apparatus of claim 18, wherein the first shared RF spectrum region overlaps in frequency with the second shared RF spectrum region.

20. The apparatus of claim 19, wherein the first shared RF spectrum region corresponds to a first time period and the second shared RF spectrum region corresponds to a second time period different from the first time period.

21. The apparatus of claim 18, wherein the processor and memory are further configured to:
perform a second LBT procedure in a third shared RF spectrum region comprising a third set of time and frequency resources to access a fourth set of time and frequency resources in a fourth shared RF spectrum region, wherein the third shared RF spectrum region overlaps in time with the first shared RF spectrum region, and wherein the third shared RF spectrum region corresponds to a third time period and the fourth shared RF spectrum region corresponds to a fourth time period different from the third time period; and
transmit data using the fourth set of time and frequency resources in the fourth shared RF spectrum region based at least in part on the performed second LBT procedure.

22. The apparatus of claim 21, wherein the processor and memory configured to transmit data using the fourth set of time and frequency resources in the fourth shared RF spectrum region and using the second set of time and frequency resources in the second shared RF spectrum region comprise:
transmit data continuously across the second set of time and frequency resources in the second shared RF spectrum region and the fourth set of time and frequency resources in the fourth shared RF spectrum region.

23. The apparatus of claim 18, wherein the second shared RF spectrum region comprises resources allocated in multiple sub-channels, and wherein the LBT procedure is performed to access resources in a first sub-channel of the multiple sub-channels, the processor and memory configured to:
perform, during the LBT procedure, a second LBT procedure in a third shared RF spectrum region to access resources in a second sub-channel of the multiple sub-channels, wherein the third shared RF spectrum region overlaps in time with the first shared RF spectrum region; and
transmit data using the resources in the first sub-channel and resources in the second sub-channel based at least in part on the performed second LBT procedure.

24. The apparatus of claim 23, wherein the processor and memory are further configured to:
determine a maximum transmit power for transmissions in at least one of the first shared RF spectrum region and the third shared RF spectrum region; and
transmit, at a transmit power lower than the maximum transmit power, using the first shared RF spectrum region and the third shared RF spectrum region based at least in part on the determined maximum transmit power.

25. The apparatus of claim 23, wherein the processor and memory are further configured to:
decrement a backoff count associated with the LBT procedure and the second LBT procedure, wherein transmitting data using the resources in the first sub-channel and transmitting data using the resources in the second sub-channel are based at least in part on the backoff count reaching a value.

26. The apparatus of claim 25, wherein the processor and memory are further configured to:
identify an indication of a range of starting values for the backoff count, wherein the range of starting values is based at least in part on a number of resources used for transmitting data; and
select a starting value for the backoff count based at least in part on the received indication of the range of starting values.

27. The apparatus of claim 18, wherein the processor and memory are further configured to:
identify an indication of a size of the first shared RF spectrum region, wherein the indication is based at least in part on a size of the second shared RF spectrum region, an energy measurement criterion, or both; and
select the size of the first shared RF spectrum region based at least in part on the received indication.

28. The apparatus of claim 18, wherein a size of the first shared RF spectrum region is smaller than a size of the second shared RF spectrum region.

29. The apparatus of claim 18, wherein the second shared RF spectrum region comprises resources allocated in multiple sub-channels, and wherein the LBT procedure in the first shared RF spectrum region is performed to access resources in a subset of the multiple sub-channels.

30. A non-transitory computer readable medium storing code for wireless communication, the code comprising instructions executable by a processor to:
- perform, by a user equipment (UE) in a synchronous communications system, a listen-before-talk (LBT) procedure in a first shared radio frequency (RF) spectrum region comprising a first set of time and frequency resources to access a second set of time and frequency resources in a second shared RF spectrum region that is different than the first shared RF spectrum region, the first shared RF spectrum region having a smaller number of RF spectrum bands than the second shared RF spectrum region, wherein the first shared RF spectrum region and the second shared RF spectrum region are within a same channel;
- determine that the second shared RF spectrum region is available based at least in part on the performed LBT procedure in the first shared RF spectrum region; and
- transmit data using the resources in the second shared RF spectrum region based at least in part on the determination.

* * * * *